US009201288B2

(12) United States Patent
Oikawa

(10) Patent No.: US 9,201,288 B2
(45) Date of Patent: Dec. 1, 2015

(54) IMAGE PROCESSING APPARATUS WITH BLUR CORRECTING FUNCTION

(75) Inventor: Makoto Oikawa, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 712 days.

(21) Appl. No.: 13/258,241

(22) PCT Filed: Apr. 20, 2010

(86) PCT No.: PCT/JP2010/057316
§ 371 (c)(1), (2), (4) Date: Sep. 21, 2011

(87) PCT Pub. No.: WO2010/131561
PCT Pub. Date: Nov. 18, 2010

(65) Prior Publication Data
US 2012/0007997 A1 Jan. 12, 2012

(30) Foreign Application Priority Data
May 12, 2009 (JP) ................................ 2009-115592

(51) Int. Cl.
*G03B 13/36* (2006.01)
*G03B 15/00* (2006.01)
(Continued)

(52) U.S. Cl.
CPC ................ *G03B 13/36* (2013.01); *G03B 15/00* (2013.01); *G03B 17/18* (2013.01); *G06T 1/00* (2013.01);
(Continued)

(58) Field of Classification Search
CPC ............ H04N 5/2356; H04N 5/23212; H04N 5/23229; H04N 5/2312; H04N 5/23287; G06T 5/003; G06T 5/004; G03B 13/36
USPC ................................................. 348/352, 354
See application file for complete search history.

(56) References Cited

U.S. PATENT DOCUMENTS 5,479,236 A * 12/1995 Tanaka ............................ 396/55
7,260,270 B2 * 8/2007 Kusaka ......................... 382/275
(Continued)

FOREIGN PATENT DOCUMENTS

CN 1959468 A 5/2007
EP 1 726 984 A1 11/2006
(Continued)

OTHER PUBLICATIONS

Russian Office Action cited in Russian counterpart application No. RU2011150281, dated Jan. 24, 2013. English translation provided.
(Continued)

*Primary Examiner* — Ahmed A Berhan
(74) *Attorney, Agent, or Firm* — Rossi, Kimms & McDowell LLP

(57) ABSTRACT

The invention provides an image pickup apparatus with a blur correcting unit which has a display function of causing a photographer to easily confirm a photographed image. The image pickup apparatus includes photographing lens which forms an object image, a photoelectric conversion unit which is disposed on a predicted image plane of the photographing lens, a display unit which displays a photographed image obtained by the photoelectric conversion unit, an image display control unit which displays the photographed image by the display unit after the photographed image is obtained by the photoelectric conversion unit, a distance information acquiring unit which obtains distance information in the photographed image, and a blur correcting unit which performs blur correction on the photographed image based on the distance information obtained by the distance information acquiring unit. The image display control unit displays the photographed image where plural distances in the photographed image are focused.

23 Claims, 13 Drawing Sheets

BACKGROUND1 (OUT OF FOCUS)
TARGET2 (IN FOCUS)
TARGET3 (IN FOCUS)
TARGET1 (IN FOCUS)

POST-PHOTOGRAPHING CONFIRMATION IMAGE DISPLAY SUBROUTINE — S400
OBTAINING OBJECT DISTANCE MAP — S401
SETTING BLUR CORRECTING AREA AND DISTANCE — S402
BLUR CORRECTION SUBROUTINE — S500
DISPLAYING IMAGE — S403
RETURN

(51) Int. Cl.

| | |
|---|---|
| ***G03B 17/18*** | (2006.01) |
| ***G06T 1/00*** | (2006.01) |
| ***H04N 5/232*** | (2006.01) |
| ***H04N 5/369*** | (2011.01) |
| ***H04N 5/3745*** | (2011.01) |

(52) U.S. Cl.

CPC ....... *H04N 5/23212* (2013.01); *H04N 5/23219* (2013.01); *H04N 5/23248* (2013.01); *H04N 5/3696* (2013.01); *H04N 5/37457* (2013.01); *G03B 2205/0007* (2013.01)

(56) References Cited

U.S. PATENT DOCUMENTS

| | | | | |
|---|---|---|---|---|
| 7,262,798 | B2 * | 8/2007 | Stavely et al. | 348/255 |
| 2003/0002746 | A1 * | 1/2003 | Kusaka | 382/255 |
| 2003/0002870 | A1 | 1/2003 | Baron | |
| 2003/0052991 | A1 * | 3/2003 | Stavely et al. | 348/370 |
| 2006/0269150 | A1 | 11/2006 | Lee | |
| 2008/0131019 | A1 | 6/2008 | Ng | |

FOREIGN PATENT DOCUMENTS

| | | | | |
|---|---|---|---|---|
| JP | 08-251475 | A | | 9/1996 |
| JP | 08251475 | A | * | 9/1996 |
| JP | 8251475 | A | | 9/1996 |
| JP | 9046596 | A | | 2/1997 |
| JP | 2000-020691 | A | | 1/2000 |
| JP | 2000020691 | A | | 1/2000 |
| JP | 2000156823 | A | | 6/2000 |
| JP | 2003-241067 | A | | 8/2003 |
| JP | 2003241067 | A | | 8/2003 |
| JP | 2004317699 | A | | 11/2004 |
| JP | 2006019874 | A | | 1/2006 |
| JP | 2006195738 | A | | 7/2006 |
| JP | 2008-028454 | A | | 2/2008 |
| JP | 2008028454 | A | | 2/2008 |
| JP | 2008294785 | A | * | 12/2008 |
| WO | 2008/003348 | A1 | | 1/2008 |
| WO | 2008003348 | A1 | | 1/2008 |

OTHER PUBLICATIONS

Chinese Office Action issued in Chinese counterpart appln. No. CN2010800212931, dated Nov. 11, 2013 English translation provided.

Extended European Search Report for EP 10774819.6, mail date May 22, 2013.

Russian Office Action cited in Russian counterpart application No. RU2011150281, dated Oct. 30, 2013. English translation provided.

Official Action issued in JP2014-025345, mailed Dec. 25, 2014.

Official Action issued in JP2014-025345, mailed Dec. 25, 2014. English translation provided.

International Search Report and Written Opinion issued on Jul. 6, 2010 cited in corresponding PCT/JP2010/057316.

Office Action issued in RU2014119389, mailed Jul. 13, 2015. English translation provided.

Office Action issued in EP10774819.6, mailed Sep. 25, 2015.

* cited by examiner

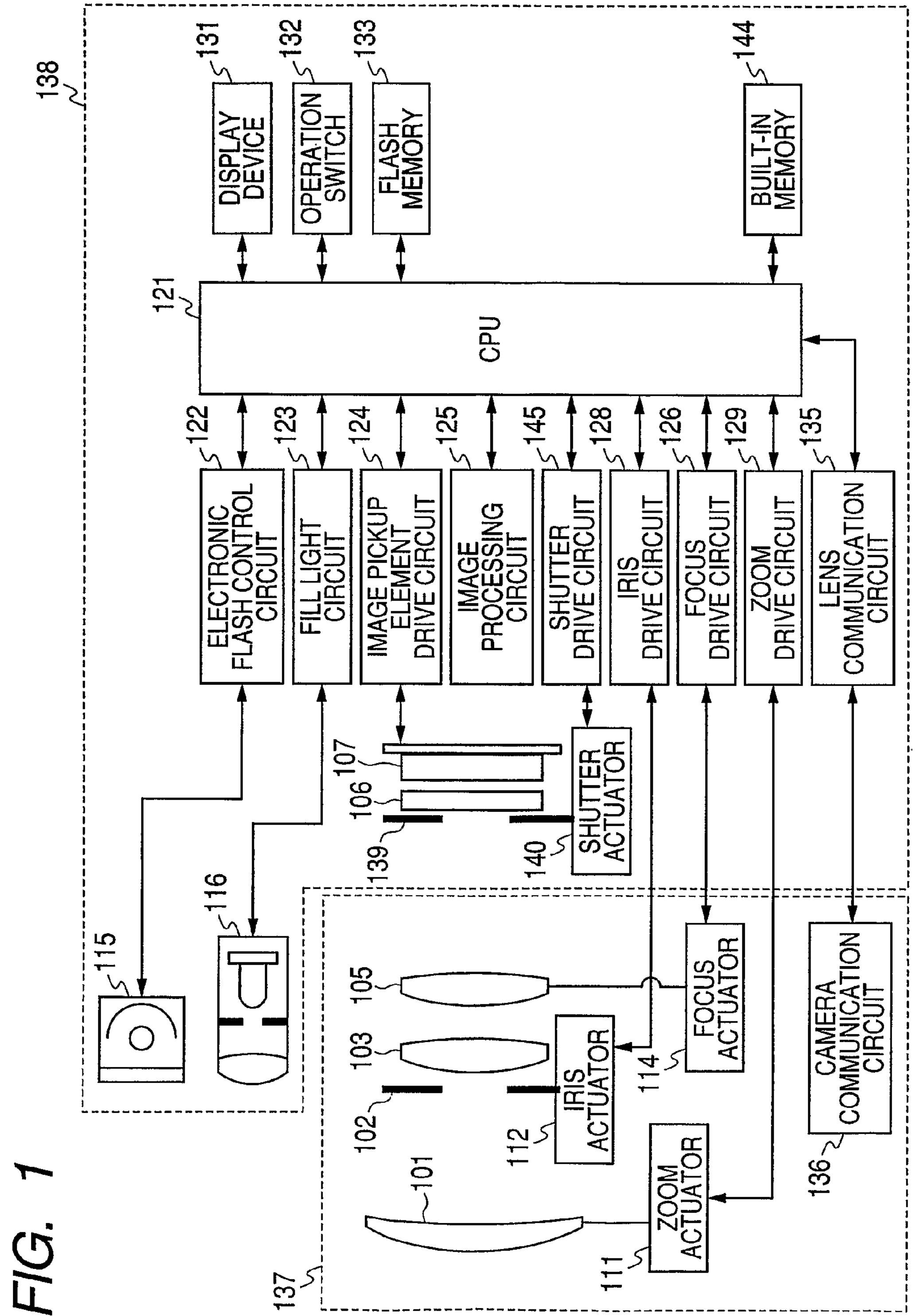
FIG. 1
138
DISPLAY DEVICE
OPERATION SWITCH
FLASH MEMORY
BUILT-IN MEMORY
CPU
ELECTRONIC FLASH CONTROL CIRCUIT
FILL LIGHT CIRCUIT
IMAGE PICKUP ELEMENT DRIVE CIRCUIT
IMAGE PROCESSING CIRCUIT
SHUTTER DRIVE CIRCUIT
IRIS DRIVE CIRCUIT
FOCUS DRIVE CIRCUIT
ZOOM DRIVE CIRCUIT
LENS COMMUNICATION CIRCUIT
SHUTTER ACTUATOR
FOCUS ACTUATOR
IRIS ACTUATOR
ZOOM ACTUATOR
CAMERA COMMUNICATION CIRCUIT
131
132
133
144
121
122
123
124
125
145
128
126
129
135
107
106
139
140
115
116
105
103
102
101
114
112
111
136
137

IMAGE PROCESSING APPARATUS WITH BLUR CORRECTING FUNCTION

TECHNICAL FIELD

The present invention relates to an image pickup apparatus that enables blur correction based on distance information of an object included in a photographed image.

BACKGROUND ART

In the related art, an image pickup apparatus that can discretely distribute focus detection pixels between pixel groups of a photoelectric conversion unit and calculate an object distance based on signals from the focus detection pixels is disclosed in Japanese Patent Application Laid-Open No. 2000-156823 (hereinafter, referred to as "Patent Document 1"). If the configuration that is disclosed in Patent Document 1 is used, a distance distribution on an object included in a photographed image can be obtained.

As a method that restores a blurred image and generates a blur restored image, for example, a method using a Wiener filter, a general inverse filter or a projection filter is used. A technique for correcting the blur using the above method is disclosed in Japanese Patent Application Laid-Open No. 2000-20691 (hereinafter, referred to as "Patent Document 2"). By using the technique that is disclosed in Patent Document 2, a deterioration function can be calculated by a physical analysis based on a photographing condition or estimation based on an output form a measuring device in the image pickup apparatus and a blurred image can be restored using an image restoration algorithm called deconvolution.

In general, an object distance to be focused may be determined by a focus state at the time of photographing. For this reason, the object distance to be focused cannot be changed after photographing. However, if an object distance distribution in a photographed image is obtained using the technique disclosed in Patent Document 1 and blur correction is performed using the blur correction technique disclosed in Patent Document 2, the object distance to be focused can be changed after photographing.

DISCLOSURE OF THE INVENTION

However, when the technologies that are disclosed in Patent Documents 1 and 2 are adapted to the image pickup apparatus, it is difficult for a photographer to confirm a photographed image.

If the technologies disclosed in Patent Documents 1 and 2 are used, after the photographing, blur correction is switched according to the object distance to change the object distance to be focused. However, a focus lens movement range of a photographing lens is restricted, and extreme conversion processing is executed at the time of restoring a blurred image if the blur amount is excessively large and a noise is likely to be generated. As a result, an object distance range where the blur can be corrected or the blur amount is restricted. For this reason, the object distance to be focused or the blur amount is also restricted within a predetermined range. The photographer views confirmation image display immediately after photographing and estimates a range of the object distances to be focused. However, it is very difficult to grasp a range of object distances to be focused, from an image where certain object distance is focused.

Regardless of an area in which an image to be focused can be obtained by the blur correction processing after photographing, the case where photographed image confirmation display after photographing is displayed in a state where the focus is not made is assumed. In this case, even though a failure part that is not desired by the photographer is generated in the area, the photographed image confirmation display is displayed in a blurred state. As a result, the photographer cannot confirm the failure part immediately after photographing and first confirms the failure part when the blur is corrected after photographing.

The present invention has been made in view of the above problems and it is an object of the present invention to provide an image pickup apparatus with a blur correcting unit which causes a photographer to easily confirm a photographed image.

In order to achieve the above object, an image pickup apparatus according to the present invention includes photographing lens that forms an object image, a photoelectric conversion unit which is disposed on a predicted image plane of the photographing lens, a display unit which displays a photographed image obtained by the photoelectric conversion unit, an image display control unit which displays the photographed image by the display unit after the photographed image is obtained by the photoelectric conversion unit, a distance information acquiring unit which obtains distance information in the photographed image, and a blur correcting unit which performs blur correction on the photographed image based on the distance information obtained by the distance information acquiring unit. The image display control unit displays the photographed image where plural distances in the photographed image are focused.

Another image pickup apparatus of the present invention includes photographing lens that forms an object image, a photoelectric conversion unit which is disposed on a predicted image plane of the photographing lens, a display unit which displays a photographed image obtained by the photoelectric conversion unit, an image display control unit which displays the photographed image by the display unit after the photographed image is obtained by the photoelectric conversion unit, a distance information acquiring unit which obtains distance information in the photographed image, and a blur correcting unit which performs blur correction on the photographed image based on the distance information obtained by the distance information acquiring unit. The image display control unit displays a range where blur is correctable.

The image pickup apparatus of the present invention can display a photographed image where corrected is blur of objects existing at the plural distances in a range from the first distance to the second distance in the photographed image as the confirmation image immediately after photographing. That is, the image pickup apparatus can display a blur corrected image where the plural distances in the photographed image are focused to display a confirmation image where the photographer can easily grasp a blur correctable range. According to the blur corrected image of the present invention, a failure part of photographing in an area where an image to be focused can be obtained can be easily discovered. By displaying the positions and the number of detected objects to be superimposed on the blur corrected photographed image, the photographer can easily grasp the positions and the number of detected objects. As such, according to the present invention, an image pickup apparatus that causes the photographer to easily confirm the photographed image can be realized.

Further features of the present invention will become apparent from the following description of exemplary embodiments with reference to the attached drawings.

BRIEF DESCRIPTION OF THE DRAWINGS

FIG. 1 is a diagram illustrating the configuration of a camera according to the present invention.

BEST MODE FOR CARRYING OUT THE INVENTION

Figure 2:
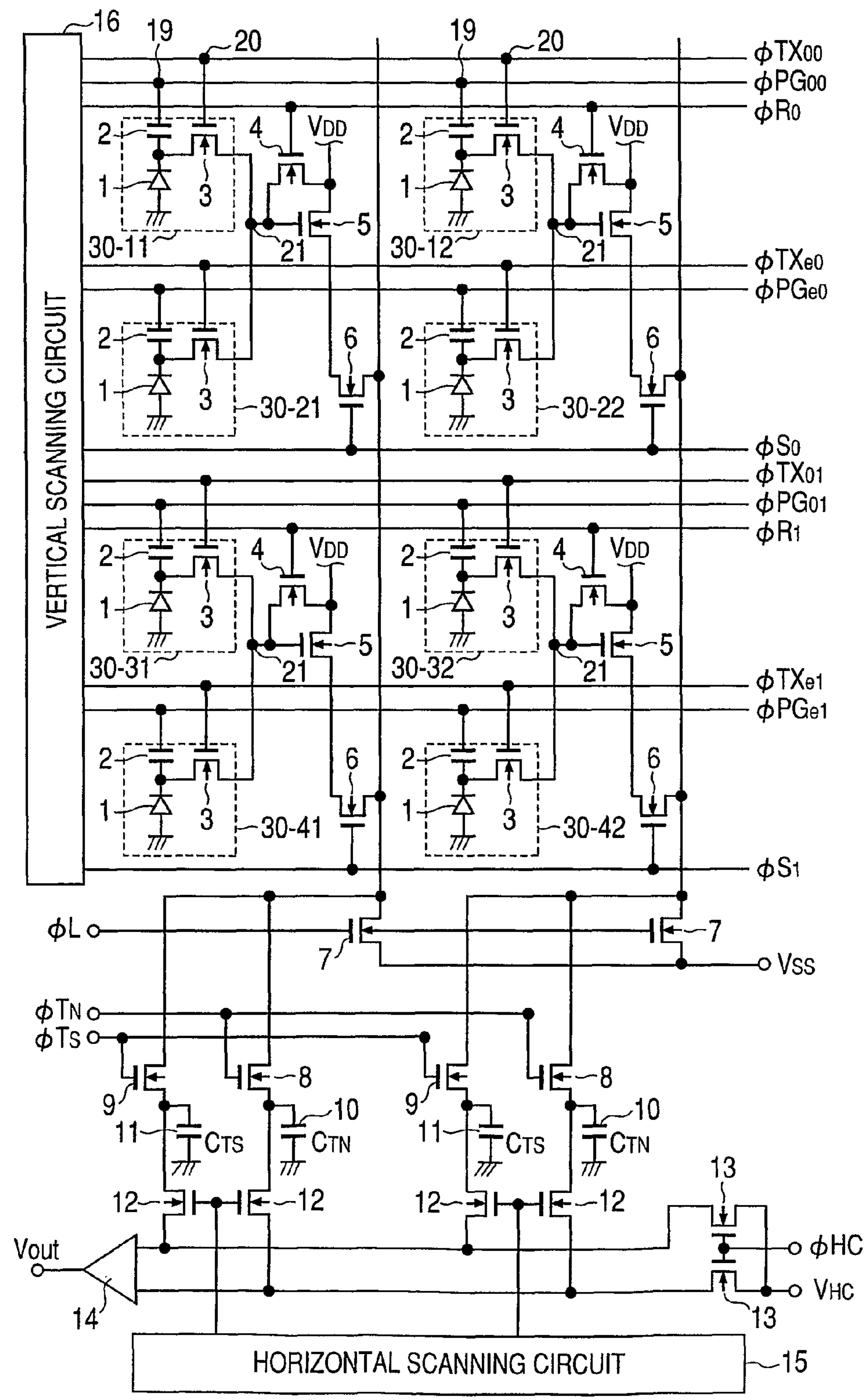
FIG. 2 is a diagram illustrating a circuit of an image pickup element that is used in the camera according to the present invention.

Hereinafter, exemplary embodiments of the present invention will be described in detail based on the accompanying drawings.

First Embodiment

FIGS. 1 to 19 illustrate a first embodiment of the present invention. A function of the first embodiment of the present invention will be described using the drawings.

FIG. 1 is a diagram illustrating the configuration of an image pickup apparatus according to the present invention, which illustrates an electronic camera that includes a camera body 138 having an image pickup element and a separated photographing lens 137 and enables an exchange of the photographing lens 137 with respect to the camera body 138.

First, the configuration of the photographing lens 137 will be described. A first lens group 101 that is disposed on a front end of a photographing optical system (imaging optical system) is held to be movable forward and backward (move forward and go back) in an optical axis direction. An iris 102 adjusts an aperture diameter and adjusts the light amount at the time of photographing. 103 indicates a second lens group. The iris 102 and the second lens group 103 are integrated with each other and move forward and go back in the optical axial direction, and perform a magnifying operation (zoom function) in linkage with the moving operation of the first lens group 101.

A third lens group 105 moves forward and goes back in the optical axis direction and performs focus adjustment. A zoom actuator 111 rotates a cam barrel (not illustrated) and moves the first lens group 101 and the second lens group 103 forward or goes the first lens group 101 and the second lens group 103 back in the optical axis direction and performs a magnifying operation. An iris actuator 112 controls an aperture diameter of the iris 102 and adjusts the photographing light amount. A focus actuator 114 moves the third lens group 105 forward or goes the third lens group 105 back in the optical axis direction and performs a focus adjusting operation.

A camera communication circuit 136 transmits information of a lens to the camera or receives the information of the camera. The information of the lens includes a zoom state, an iris state, a focus state, and lens frame information. The camera communication circuit 136 transmits the information to a lens communication circuit 135 provided at the camera side.

Next, the camera body 138 will be described. An optical low-pass filter 106 is an optical element to alleviate a fault color or moire of a photographed image. An image pickup element 107 includes a C-MOS sensor and a peripheral circuit thereof. As the image pickup element, a two-dimensional single plate color sensor (photoelectric conversion unit) where a primary-color color mosaic filter of a Bayer array is formed in an on-chip type on light receiving pixels of m×n in transverse and longitudinal directions is used.

A shutter unit 139 performs exposure time control at the time of photographing a still image. A shutter actuator 140 activates the shutter 139.

As an object illumination electronic flash 115 at the time of photographing, a flash illumination apparatus using a xenon tube is suitable, but an illumination device including an LED that continuously emits light may be used. An AF auxiliary optical unit 116 projects an image of a mask having a predetermined opening pattern onto a field through a projection lens and improves focus detection ability with respect to a dark object or an object with low contrast.

A CPU 121 that is a CPU built in the camera to perform various control operations on the camera body has an operation unit, a ROM, a RAM, an A/D converter, a D/A converter, and a communication interface circuit. The CPU 121 drives various circuits of the camera based on a predetermined program stored in the ROM and executes a series of operations, such as AF, photographing, image processing, and recording.

An electronic flash control circuit 122 controls turning-on of the illumination unit 115 in synchronization with the photographing operation. An auxiliary light drive circuit 123 controls turning-on of the AF auxiliary optical unit 116 in synchronization with the focus detection operation. An image pickup element drive circuit 124 controls the image pickup operation of the image pickup element 107, converts an A/D conversion on an obtained image signal, and transmits the image signal to the CPU 121. An image processing circuit 125 executes processing, such as gamma conversion, color interpolation, and JPEG compression, with respect to an image obtained by the image pickup element 107.

A focus drive circuit 126 controls driving of the focus actuator 114 based on a focus detection result, moves the third lens group 105 forward or goes the third lens group 105 back in the optical axis direction, and performs the focus adjustment. An iris drive circuit 128 controls driving of the iris actuator 112 and controls an aperture of the iris 102. A zoom drive circuit 129 drives the zoom actuator 111 according to the zoom operation of the photographer. A lens communication circuit 135 communicates with the camera communication circuit 136 in the photographing lens 137. A shutter drive circuit 145 drives the shutter actuator 140.

A display device 131 that is a display device such as an LCD displays information of a photographing mode of the camera, a preview image before photographing and a confirmation image after photographing, and an in-focus state display image at the time of detecting a focus. An operation switch group 132 includes a power switch, a release (photographing trigger) switch, a zoom operation switch, and a photographing mode selection switch. A detachable flash memory 133 records a photographed image. A built-in memory 144 stores a variety of data that is needed for an operation performed by the CPU 121.

FIG. 2 illustrates the schematic circuit configuration of the image pickup element according to the present invention. For example, the image pickup element can be configured using the technique disclosed in Japanese Patent Application Laid-Open No. H09-046596 applied by the present applicant. FIG. 2 illustrates pixel arrangement of only 2 columns×4 rows of a two-dimensional C-MOS area sensor, for convenience of description. However, in the actual image pickup element, plural pixels 30-11 to 30-42 to be illustrated are disposed and a high-definition image can be obtained. In the present embodiment, the image pickup element is an image pickup element where a pixel pitch is 2 μm, an effective pixel number is 3,000 columns×2,000 rows in a transverse and a longitudinal directions=6,000,000, and an image pickup screen size is 6 mm×4 mm in the transverse and the longitudinal directions.

In FIG. 2, 1 indicates a photoelectric conversion unit of a photoelectric conversion element that includes a MOS transistor gate and a depletion layer below the gate, 2 indicates a photo gate, 3 indicates a transfer switch MOS transistor, 4 indicates a MOS transistor for reset, 5 indicates a source follower amplifier MOS transistor, 6 indicates a horizontal selection switch MOS transistor, 7 indicates a load MOS transistor of a source follower, 8 indicates a dark output transfer MOS transistor, 9 indicates a light output transfer MOS transistor, 10 indicates a dark output accumulation capacity CTN, 11 indicates a light output accumulation capacity CTS, 12 indicates a horizontal transfer MOS transistor, 13 indicates a horizontal output line reset MOS transistor, 14 indicates a differential output amplifier, 15 indicates a horizontal scanning circuit, and 16 indicates a vertical scanning circuit.

Figure 3:
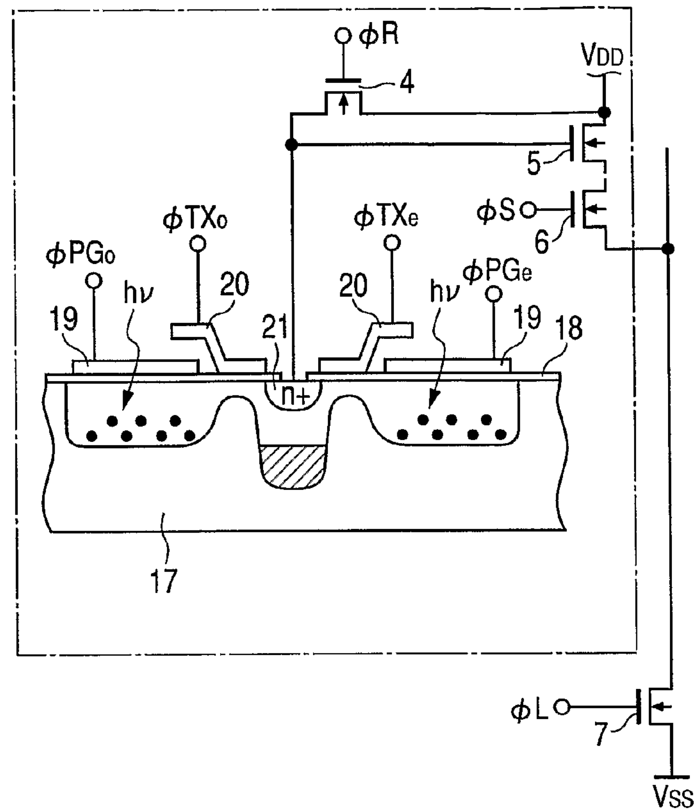
FIG. 3 is a cross-sectional view of a pixel portion of the image pickup element according to the present invention.

FIG. 3 illustrates a cross-sectional view of a photoelectric conversion pixel. In FIG. 3, 17 indicates a P-type well, 18 indicates a gate oxide film, 19 indicates a first polysilicon layer, 20 indicates a second polysilicon layer, and 21 indicates an $n^+$ floating diffusion unit (FD). The FD unit 21 is connected to another photoelectric conversion unit through another transfer MOS transistor. In FIG. 3, drains of the two transfer MOS transistors 3 and the FD unit 21 are used in common and sensitivity is improved by minuteness and a decrease in capacitance of the FD unit 21. However, the FD unit 21 may be connected by AL wiring.

FIGS. 4A, 4B and FIGS. 5A and 5B illustrate a structure of an image pickup pixel and a focus detection pixel. In the present embodiment, a Bayer array where pixels having spectrum sensitivity of G (green color) are disposed as two pixels to be diagonally arranged, among four pixels of 2 rows×2 columns, and pixels having spectrum sensitivity of R (red color) and B (blue color) are disposed as the other two pixels, respectively, is adopted. In the Bayer arrangement, the focus detection pixels are arranged according to a predetermined rule. Since the technique for discretely arranging the focus detection pixels among the image pickup pixels is the known technique that is disclosed in Patent Document 1, the description thereof will not be given.

Figure 4B:
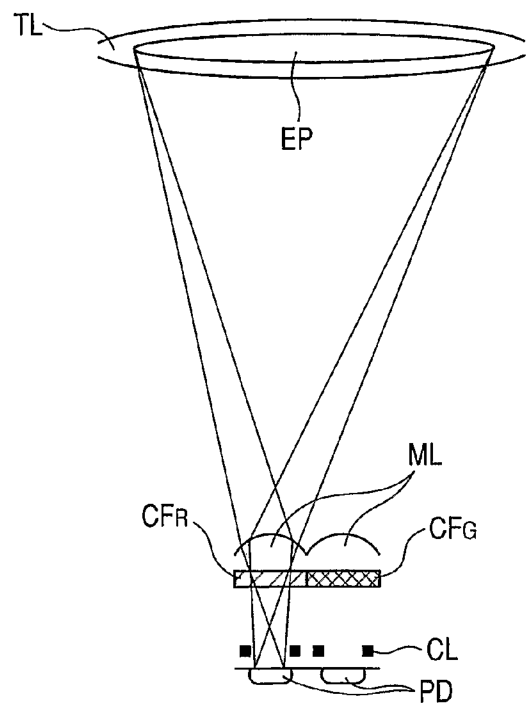
FIGS. 4A and 4B are a plan view and a cross-sectional view of an image pickup pixel of the image pickup element according to the present invention, respectively.
Figure 4A:
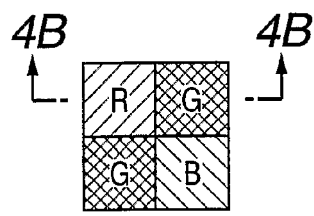

FIGS. 4A and 4B illustrate the arrangement and the structure of the image pickup pixels. FIG. 4A is a plan view of the image pickup pixels of 2 rows×2 columns. As known already, in the Bayer arrangement, the G pixels are disposed in a diagonal direction and the R and B pixels are disposed in the other two pixels, respectively. The structure of 2 rows×2 columns is repetitively disposed.

A section 4B-4B of FIG. 4A is illustrated in FIG. 4B. ML indicates an on-chip micro lens that is disposed on a frontmost face of each pixel, CFR indicates an R (red) color filter, and CFG indicates a G (green) color filter. PD schematically illustrates the photoelectric conversion unit of the C-MOS sensor illustrated in FIG. 3 and CL indicates a wiring layer to form signal lines to transmit various signals in the C-MOS sensor. TL schematically illustrates a photographing optical system.

In this case, the on-chip micro lens ML of the image pickup pixel and the photoelectric conversion unit PD are configured to receive light flux transmitted through the photographing optical system ML as effective as possible. That is, an exit pupil EP of the photographing optical system TL and the photoelectric conversion unit PD is in a conjugate relationship by the micro lens ML, and an effective area of the photoelectric conversion unit is designed as a large area. In FIG. 4B, incident light flux of the R pixel is illustrated. However, the G pixel and the B (Blue) pixel have the same structure.

Accordingly, exit pupils EP that correspond to the individual RGB pixels for image pickup have a large diameter, and light flux from an object is efficiently received and an S/N ratio of an image signal is improved.

Figure 5A:
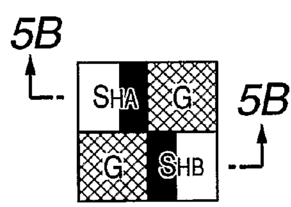
FIGS. 5A and 5B are a plan view and a cross-sectional view of a focus detection pixel of the image pickup element according to the present invention, respectively.
Figure 5B:
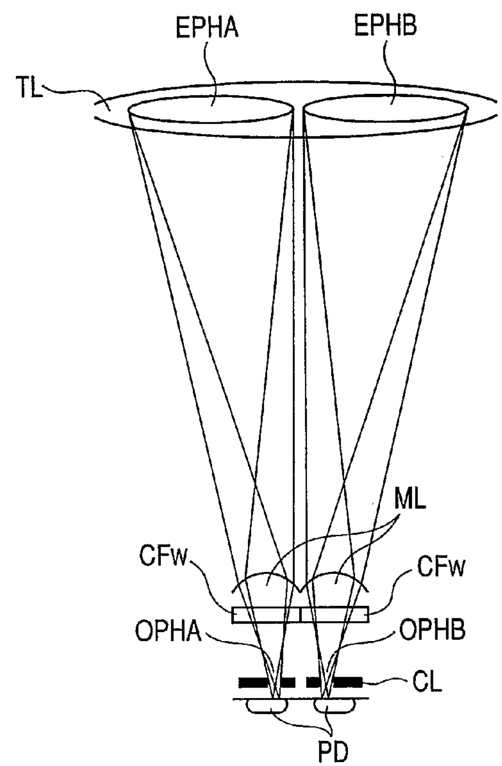

FIGS. 5A and 5B illustrate the arrangement and the structure of focus detection pixels to perform pupil division in a horizontal direction (transverse direction) of the photographing lens. FIG. 5A is a plan view of pixels of 2 rows×2 columns including the focus detection pixels. When the image pickup signal is obtained, the G pixel constitutes a main component of brightness information. Since an image recognition characteristic of an individual person is sensitive to brightness information, if the G pixel is defected, the individual person is likely to recognize that an image quality is deteriorated. Meanwhile, the R or B pixel is a pixel where color information is obtained. However, since the individual person is insensitive to color information, even though a slight defect is generated in the pixel where the color information is obtained, it is difficult to recognize the deterioration of the image quality. Accordingly, in the present embodiment, among the pixels of 2 rows×2 columns, the G pixel remains as the image pickup pixel and the R and B pixels are used as the focus detection pixels, which are illustrated by SHA and SHB in FIG. 5A.

A section 5B-5B of FIG. 5A is illustrated in FIG. 5B. The micro lens ML and the photoelectric conversion unit PD have the same structure as the image pickup pixel illustrated in FIG. 4B. In the present embodiment, since a signal of the focus detection pixel is not used as a signal of the photographed image, instead of a color separation color filter, a transparent film CFW (White) is disposed. Since the pupil division is performed by the image pickup element, an opening of the wiring layer CL is positioned deviationally in one direction with respect to a central line of the micro lens ML. Specifically, since a pixel SHA and an opening OPHA are positioned deviationally to the right, light flux that is transmitted through the left exit pupil EPHA of the photographing lens TL is received. Likewise, since an opening OPHB of a pixel SHB is positioned deviationally to the left, light flux that is transmitted through the right exit pupil EPHB of the photographing lens TL is received.

Accordingly, an object image that is obtained by regularly disposing the pixels SHA in a horizontal direction is assumed as an image A and an object image that is obtained by regularly disposing the pixels SHB in the horizontal direction is assumed as an image B. In this case, a defocus mount of the photographing lens 137 can be detected by detecting relative positions of the image A and the image B.

In this case, the micro lens ML performs a function of a lens element that generates a pair of optical images of the image A formed by the light flux transmitted through the left exit pupil EPHA of the photographing lens TL and the image B formed by the light flux transmitted through the right exit pupil EPHB of the photographing lens TL.

In the pixels SHA and SHB, with respect to an object that has a brightness distribution in a transverse direction of a photographing screen, for example, a longitudinal line, focus detection is enabled. However, with respect to a transverse line that has a brightness distribution in a longitudinal direction, the focus detection is disabled. Accordingly, in the present embodiment, pixels that perform the pupil division are also included in a vertical direction (longitudinal direction) of the photographing screen, such that the focus detection is enabled with respect to the transverse line.

Figure 6A:
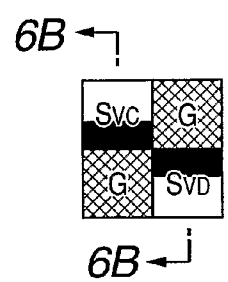
FIGS. 6A and 6B are a plan view and a cross-sectional view of another focus detection pixel of the image pickup element according to the present invention, respectively.
Figure 6B:
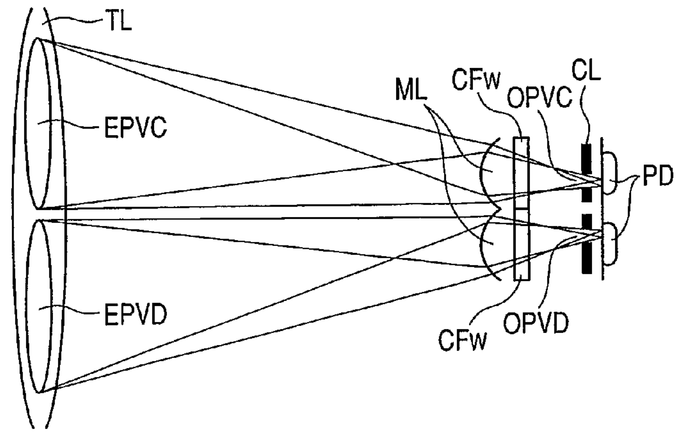

FIGS. 6A and 6B illustrate the arrangement and the structure of focus detection pixels to perform the pupil division in the vertical direction of the photographing screen. FIG. 6A is a plan view of pixels of 2 rows×2 columns including the focus detection pixels. Similar to FIG. 5A, the G pixels remain as the image pickup pixels and the R and B pixels are used as the focus detection pixels, which are illustrated by SVC and SVD in FIG. 6A.

A section 6B-6B of FIG. 6A is illustrated in FIG. 6B. The pixel structure of FIG. 5B is the same as that of the pixel structure of FIG. 6B, except that the pixels of FIG. 5B are pupil separated in the transverse direction, but a pupil separation direction of the pixels of FIG. 6B becomes the longitudinal direction. That is, since an opening OPVC of a pixel SVC is positioned deviationally to the lower side, light flux that is transmitted through the upper exit pupil EPVC of the photographing lens TL is received. Likewise, since an opening OPVD of a pixel SVD is positioned deviationally to the upper side, light flux that is transmitted through the lower exit pupil EPVD of the photographing lens TL is received. Accordingly, an object image that is obtained by regularly disposing the pixels SVC in a vertical direction is assumed as an image C and an object image that is obtained by regularly disposing the pixels SVD in the vertical direction is assumed as an image D. In this case, a defocus mount of the object image that has a brightness distribution in the vertical direction can be detected by detecting relative positions of the image C and the image D.

Figure 7:
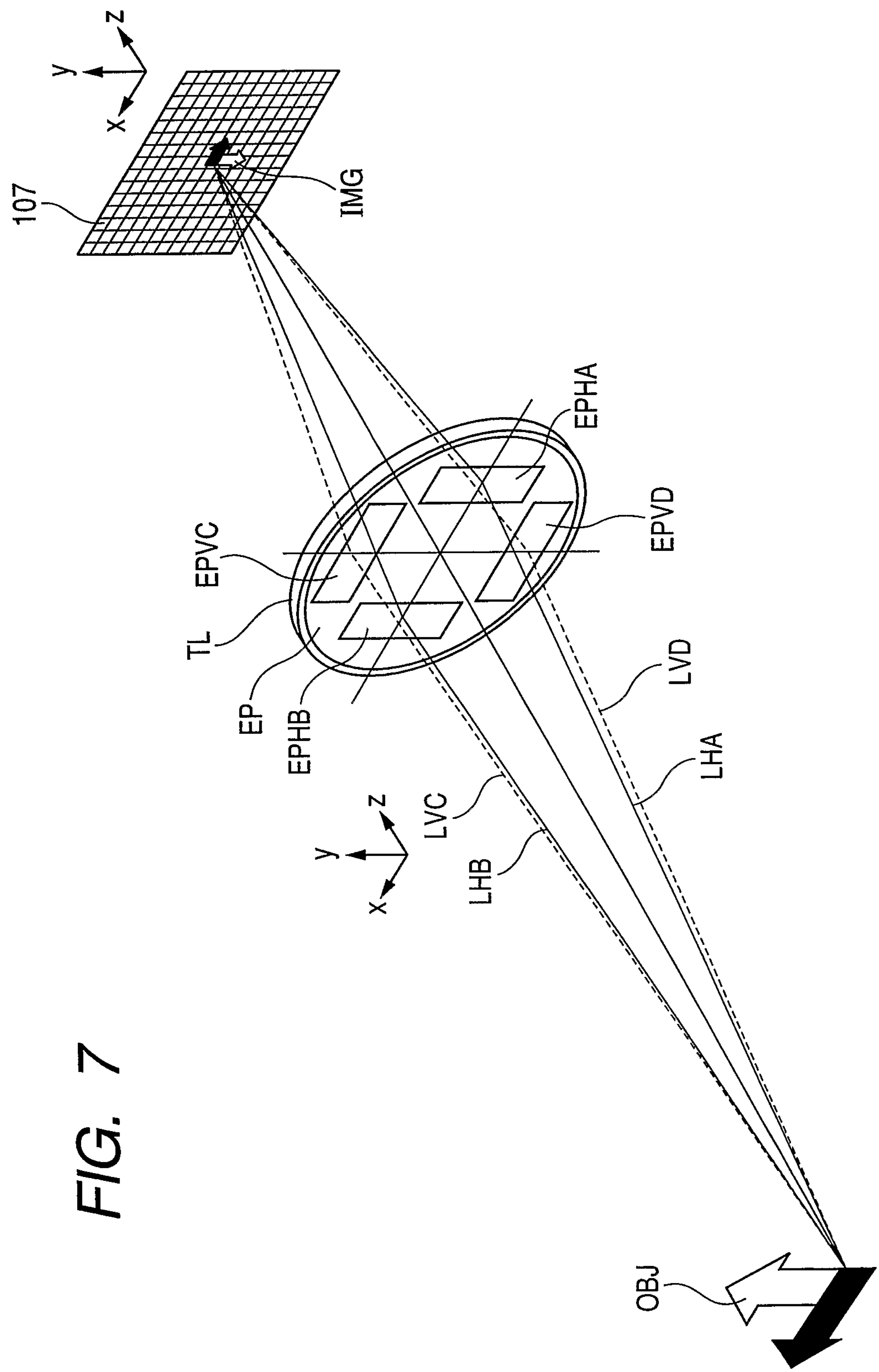
FIG. 7 is a conceptual diagram illustrating a pupil division situation of the image pickup element according to the present invention.

FIG. 7 conceptually illustrates a pupil division situation of the image pickup element according to the present invention. TL indicates a photographing lens, 107 indicates an image pickup element that is disposed on a predicted image plane of the photographing lens, OBJ indicates an object, and IMG indicates an object image.

As illustrated in FIGS. 4A and 4B, the image pickup pixel receives light flux that is transmitted through an entire exit pupil area EP of the photographing lens. Meanwhile, as illustrated in FIGS. 5A, 5B, 6A, and 6B, the focus detection pixel has a pupil division function. Specifically, the focus detection pixel SHA illustrated in FIGS. 5A and 5B receives the light flux that is transmitted through the left pupil when viewing the back end of the lens from the image pickup plane), that is, light flux that is transmitted through the pupil EPHA of FIG. 7. Likewise, the focus detection pixels SHB, SVC, and SVD receive the light fluxes that are transmitted through the pupils EPHB, EPVC, and EPVD. If the focus detection pixels are disposed to be distributed over the entire area of the image pickup element 107, the focus detection is enabled over the entire area of the image pickup area. The CPU 121 that functions as a distance information acquiring unit calculates an object distance based on the focus detection information and the lens information such as the focus distance.

Figure 8:
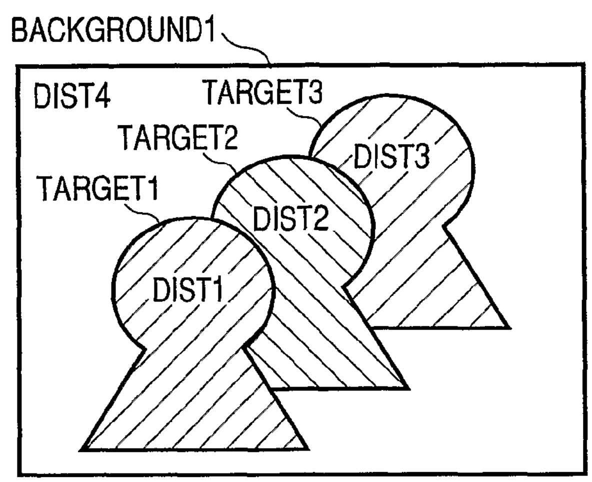
FIG. 8 is a conceptual diagram illustrating distance information obtained in the present invention.

FIG. 8 illustrates distance information that is obtained by the distance information acquiring unit. In the image pickup element 107 according to the present invention, since the focus detection pixels SHA, SHB, SHC, and SHD illustrated in FIGS. 5A, 5B, 6A, and 6B are distributed over the entire area, the object distance at an arbitrary position of the photographing screen can be obtained. If areas where the object distances are short in a distribution of the obtained object distances are jointed and grouped, the outline of the object that is included in the photographing screen can be extracted. Target1, Target2, and Target3 indicate the extracted object areas and BackGround1 indicates a background area. Dist1, Dist2, Dist3, and Dist4 indicate the object distances. Dist1 indicates the object distance in the object area Target1, Dist2 indicates the object distance in the object area Target2, Dist3 indicates the object distance in the object area Target3, and Dist4 indicates the object distance in the background area Background1. Dist1 is nearest, Dist2 is second nearest, and Dist3 is third nearest. In addition, Dist4 is most distant.

The CPU 121 extracts the object from the distribution of the object distance obtained from the focus detection pixel and obtains the area and the distance of each object.

In the image pickup apparatus according to the present invention, the blur of the photographed image is corrected based on the distance information. A blur generating course can be estimated from an image pickup apparatus characteristic or a photographing lens characteristic. A blur function where the blur generating course is modeled is defined and a blurred image is restored by an image restoration algorithm generally called deconvolution such as a Wiener filter, thereby correcting the blur. Since the blur correcting method is described in Patent Document 2, the detailed description thereof will not be given herein.

Figure 9:
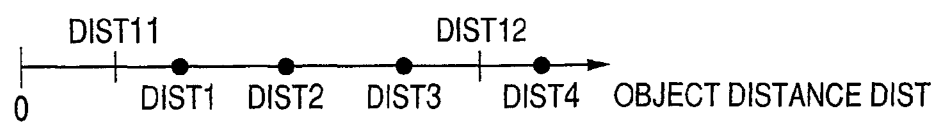
FIG. 9 is a diagram illustrating a relationship between an object distance and a blur correctable distance in the present invention.

FIG. 9 illustrates a relationship between the object distances Dist1, Dist2, Dist3, and Dist4 and the blur correctable distance. An axis indicates the object distance Dist.

The object distance to be focused is determined by the distance covered by the photographing lens 137. Since it is difficult to predict a blur shape of the distance not to be focused, the blur correctable distance is also restricted within a range of distances almost equal to the distance. Accordingly, the CPU 121 calculates a range of distances to correct the blur according to the distance covered from the photographing lens 137. An end of nearest side distance to correct the blur is referred to as the first distance Dist11 and an end of infinite side distance is referred to the second distance Dist12. The blur correcting unit can perform the blur correction on the object image in a range of the first distance Dist11 and the second distance Dist12. The first distance is determined based on the end of nearest side distance of the photographing lens 137 and the second distance is determined based on the end of infinite side distance. In this case, the first distance and the second distance are set with a slight margin with respect to the end of nearest side distance and the end of infinite side distance of the photographing lens 137, in consideration of a manufacture error of the photographing lens 137, focus lens stop precision, and a variation in blur correction.

Among the object distances Dist1, Dist2, Dist3, and Dist4 illustrated in FIG. 8, the object distances Dist1 to 3 are positioned in the range of the first distance Dist11 and the second distance Dist12, and the object distance Dist4 is positioned out of the range.

Figure 10:
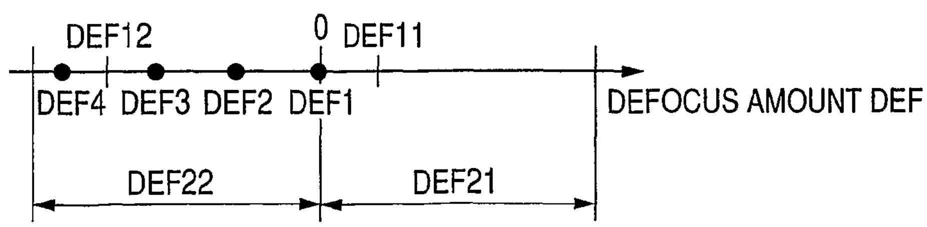
FIG. 10 is a diagram illustrating a relationship between an object distance image plane position and an image plane position of a photographing lens 137 in a first embodiment of the present invention.

FIG. 10 illustrates a relationship between positions of image planes corresponding to the object distances Dist1, Dist2, Dist3, and Dist4 and a position of an image plane of the photographing lens 137. An axis indicates the defocus amount Def from the position of the image plane of the photographing lens 137. In this case, a plus direction of the defocus amount Def corresponds to a post in-focus direction.

"0" indicates the position of the image plane of the photographing lens 137 and the shift amount is expressed as "0". Def1, Def2, Def3, and Def4 indicate the defocus amounts at the positions of the image planes of the object distances Dist1, Dist2, Dist3, and Dist4, respectively. Def11 and Def12 indicate the defocus amounts at the positions of the image planes of the first distance Dist11 of the nearest side and the second distance Dist12 of the infinite side.

Meanwhile, Def21 and Def22 indicate the defocus amounts that correspond to the blur amounts where the blur correction is enabled. When the blur amount is excessively large, extreme conversion processing is executed at the time of restoring a blurred image and a noise is likely to be generated. For this reason, when the blur is corrected, the blur amount is preferably included in the range of Def21 and Def22. In FIG. 10, the defocus amounts Def21 and Def22 that correspond to the blur amounts where the blur correction is enabled exist to be closer to the outside than the defocus amounts Def11 and Def12 at the positions of the image planes of the first distance Dist11 of the nearest side and the second distance Dist12 of the infinite side. For this reason, the first distance Dist11 of the nearest side and the second distance Dist12 of the infinite side are not updated.

Figure 11:
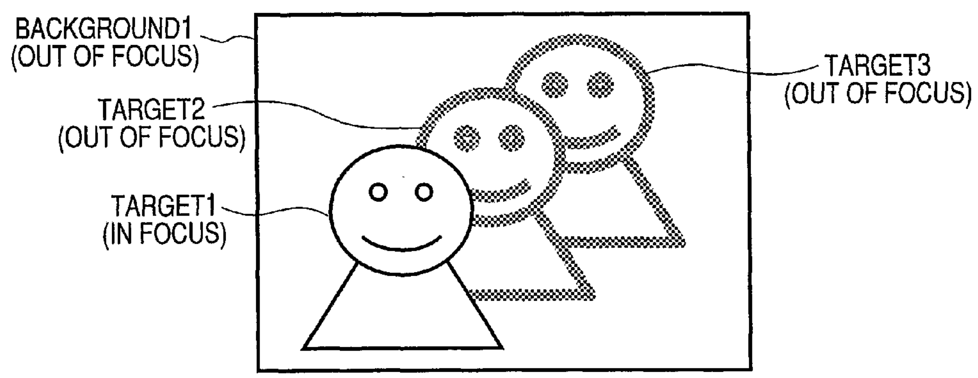
FIG. 11 is a diagram illustrating a photographed image before blur correction according to the present invention is performed.

FIG. 11 illustrates a photographed image before the blur correction is performed by the blur correcting unit. The photographed image in FIG. 11 is the same as the photographed image of FIG. 8. As described in an operation flow below, the focus detection position has the priority from the nearest side, and the position of the object that is positioned at the nearest side among the extracted objects is set as the focus detection position. For this reason, the photographed image before the blur correction is performed by the blur correcting unit becomes a state where the object area Target1 of the nearest side is focused, as illustrated in FIG. 11. The other object areas Target2, Target3, and Background1 are not focused.

Figure 12A:
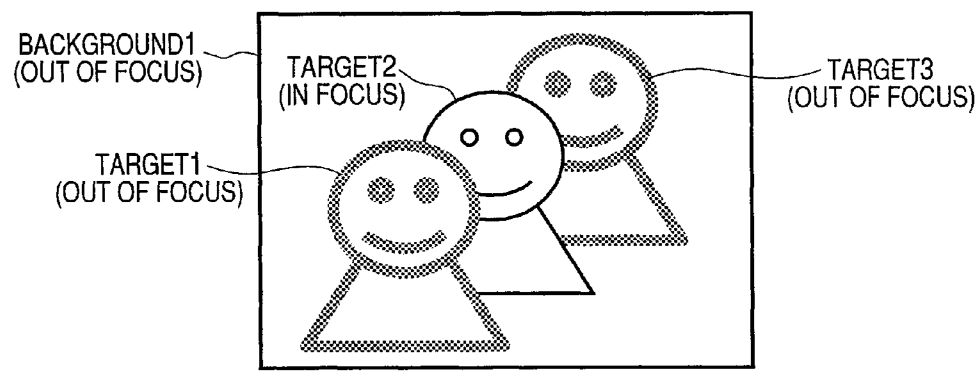
FIGS. 12A and 12B are diagrams illustrating blur correction of a photographed image according to the present invention.
Figure 12B:
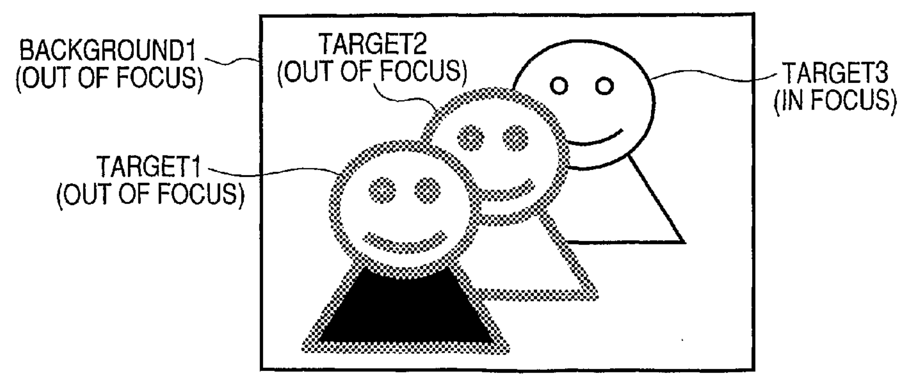

FIGS. 12A and 12B illustrate a case where the blur of the photographed image is corrected by the blur correcting unit. The image pickup images in FIGS. 12A and 12B are the same as the image pickup images of FIGS. 8 and 11. FIG. 12A illustrates an image where the blur correction is performed over the entire area of the photographed image, based on the object distance Dist2 of the object area Target2. From the image pickup apparatus characteristic information and the photographing lens information that correspond to the object distance Dist2 in the object area Target2, a blur function is defined. If the correction processing based on the blur function is executed on the entire area of the photographed image, the blur of the object area Target2 is corrected and the corresponding image becomes an image to be focused. Meanwhile, if the image correction processing is executed on the areas other than the object area Target2, the blur where the focus position of the photographing lens 137 is generated in a state in which the object distance Dist2 is focused is reproduced. In this way, an image to be focused can be obtained by only the object area Target2, as illustrated in FIG. 12A.

FIG. 12B illustrates an image where the blur correction is performed on the entire area of the photographed image based on the object distance Dist3 of the object area Target3. From the image pickup apparatus characteristic information and the photographing lens information that correspond to the object distance Dist3 in the object area Target3, a blur function is defined. If the correction processing based on the blur function is executed on the entire area of the photographed image, the blur of the object area Target3 is corrected and the corresponding image becomes an image to be focused. Meanwhile, if the image correction processing is executed on the areas other than the object area Target3, the blur where the focus position of the photographing lens 137 is generated in a state in which the object distance Dist3 is focused is reproduced. In this way, an image to be focused can be obtained by only the object area Target3, as illustrated in FIG. 12B.

As described above using FIGS. 11, 12A, and 12B, in the image pickup apparatus where the blur correction based on the object distance information is enabled, if the blur correction is performed based on the distance information including the distance and the area of each object, the object to be focused can be selected.

However, as illustrated in FIGS. 11, 12A, and 12B, since a freedom degree is set to the object to be focused, the photographer is difficult to confirm the photographed image.

By the above-described blur correction, the distance of the object to be focused can be changed after photographing. However, a range of blur correctable object distances is restricted. For this reason, the object distance to be focused is also restricted within a predetermined range. The photographer views the confirmation image immediately after photographing and estimates the range of object distances to be focused. However, it is very difficult to grasp a range to be focused from an image where an arbitrary object distance is focused.

Regardless of an area in which an image to be focused can be obtained by the blur correction processing after photographing, the case where a confirmation image after photographing is displayed in a non-focused state is assumed. In this case, even though a failure part that is not desired by the photographer is generated in the area, the confirmation image is displayed in a blurred state. As a result, the photographer cannot confirm the failure part immediately after photographing and first confirms the failure part when the blur is corrected after photographing.

Accordingly, in the image pickup apparatus according to the present invention, when the nearest side distance where the blur can be corrected by the blur correcting unit is set as the first distance and the infinite side distance where the blur can be corrected by the blur correcting unit is set as the second distance, in the confirmation image display immediately after photographing, a photographed image where the blur of a range from the first distance to the second distance is corrected is displayed. That is, an image where the blur is corrected as maximum as possible is displayed.

Figure 13A:
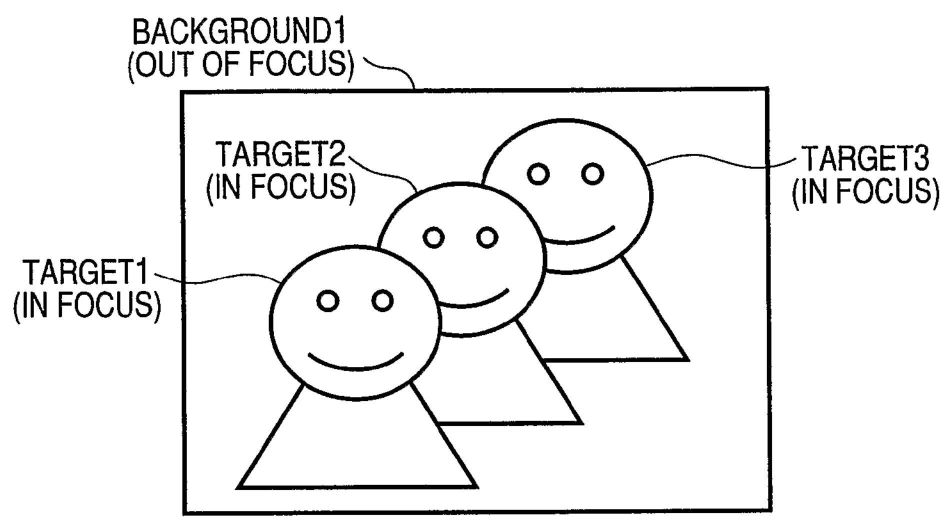
FIGS. 13A and 13B are diagrams illustrating a confirmation image according to the present invention displayed immediately after photographing.
Figure 13B:
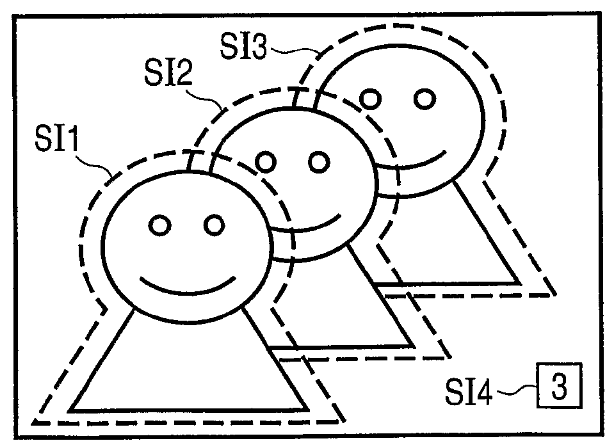

FIGS. 13A and 13B illustrate confirmation image display immediately after photographing in the present invention. The photographed images in FIGS. 13A and 13B are the same as the photographed images of FIGS. 8, 11, 12A, and 12B. FIG. 13A illustrates the case where an image where the object areas Target1 to 3 are focused is displayed. FIG. 13B illustrates the case in which the object areas Target1 to 3 are focused and the positions and the number of detected objects are displayed to be superimposed.

In FIG. 13A, since the object distances Dist1 to 3 of the object areas Target1 to 3 exist in the range of the first distance Dist11 and the second distance Dist12 where the blur can be corrected, the blur correction is enabled. Accordingly, in the image pickup apparatus according to the present invention, in the confirmation image display immediately after photographing, the blur correction is performed on the object areas Target1 to 3.

By executing the correction processing based on the image pickup apparatus characteristic information and the photographing lens information that correspond to the object distance Dist1 in the object area Target1, the blur of the object area Target1 is corrected and the corresponding image becomes an image to be focused. By executing the correction processing based on the image pickup apparatus characteristic information and the photographing lens information that correspond to the object distance Dist2 in the object area Target2, the blur of the object area Target2 is corrected and the corresponding image becomes an image to be focused. By executing the correction processing based on the image pickup apparatus characteristic information and the photographing lens information that correspond to the object distance Dist3 in the object area Target3, the blur of the object area Target3 is corrected and the corresponding image becomes an image to be focused. That is, all of the object area Target1, the object area Target2, and the object area Target3 that are positioned in the distance range where the blur can be corrected are displayed in a focused state. In other words, an image where the plural object distances Dist1, Dist2, and Dist3 are focused is displayed as confirmation image display immediately after the photographing. The background BackGround1 that is out of the distance range where the blur can be corrected is displayed in a blurred state.

FIG. 13B illustrates an aspect where the positions the number of detected objects are displayed to be superimposed on the object areas Target1 to 3 to be focused. SI1 is object position display that indicates the position of the object area Target1. SI1 is object position display that indicates the position of the object area Target1. Displaying the outline that is larger than that of the object area Target1 indicates the position of the object area Target1. Likewise, SI2 is object position display that indicates the position of the object area Target2 and SI3 is object position display that indicates the position of the object area Target3. SI4 is object number display that indicates the number of detected objects. Thereby, the photographer can easily grasp the positions and the number of detected objects, when the confirmation image is displayed after photographing.

By displaying the image illustrated in FIGS. 13A and 13B as the confirmation image after photographing, an image pickup apparatus having a photographed image function where the photographer easily confirms the photographed image can be realized. Thereby, the photographer can easily grasp the blur correctable range. The failure part in the area in which the image to be focused can be obtained by the blur correction can be easily discovered. By displaying the positions and the number of detected objects to be superimposed on the blur corrected photographed image, the photographer can easily grasp the positions and the number of detected objects, when the confirmation image is displayed after the photographing.

FIGS. 14 to 19 are flowcharts illustrating the operation of the image pickup apparatus according to the present invention.

Figure 14:
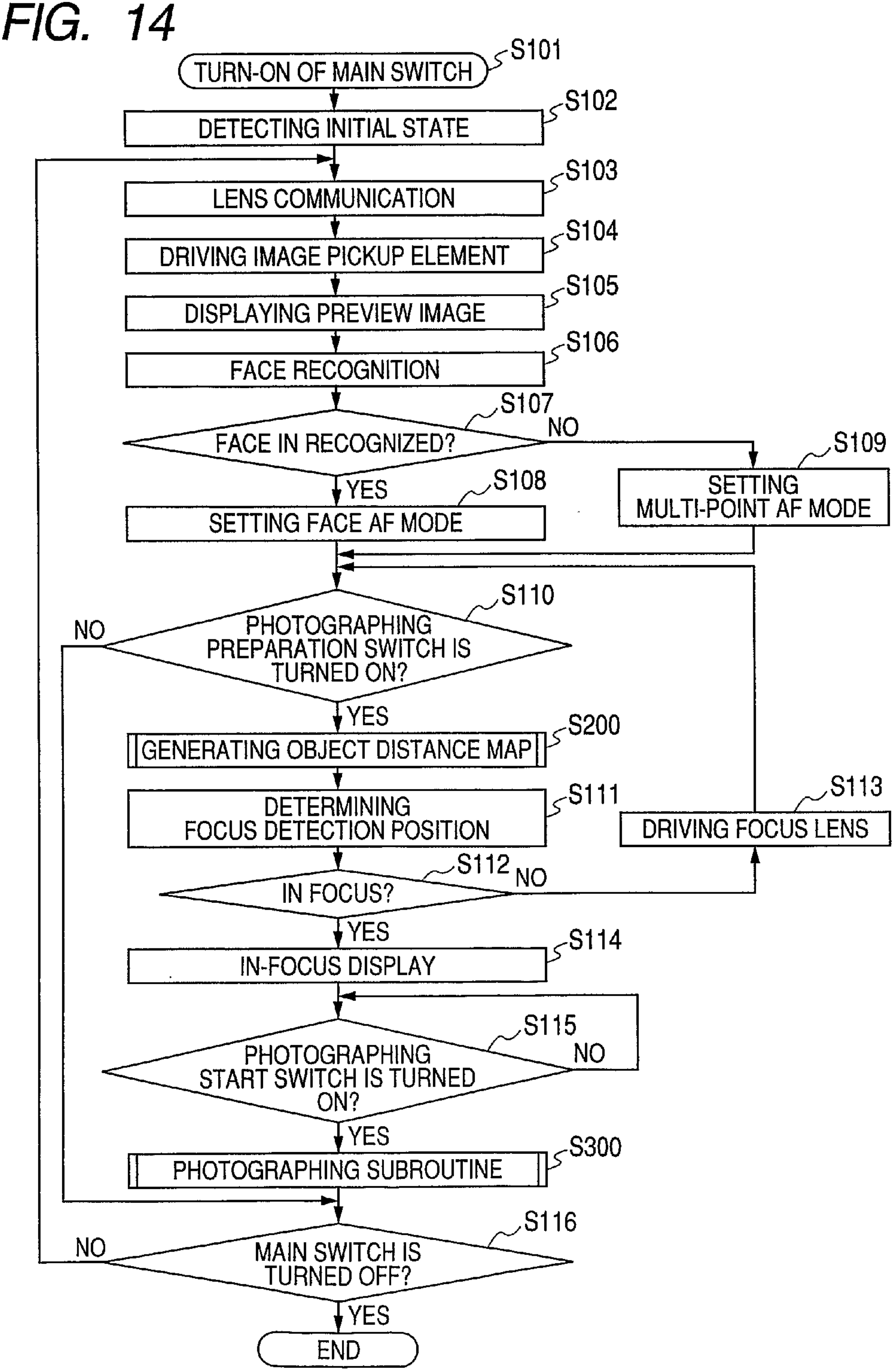
FIG. 14 is a main flowchart illustrating an operation of the image pickup apparatus according to the present invention.

FIG. 14 is a main flowchart illustrating the image pickup apparatus according to the present invention. The operation according to the main flowchart is a process that the CPU 121 executes according to the program stored in the ROM.

If the photographer turns on the power switch of the camera (S101), the CPU 121 confirms the operation of each actuator or the image pickup element in the camera, initializes the memory contents or the execution program, and executes a photographing preparation operation (S102). In step S103, the CPU performs lens communication with the camera communication circuit in the photographing lens through the lens communication circuit 135. The CPU confirms the operation of the lens by the lens communication, initializes the memory contents or the execution program in the lens, and executes the preparation operation. The CPU obtains a variety of attribute data of the lens needed for focus detection or image pickup, and holds the attribute data in the built-in memory 144. In step S104, the CPU starts the image pickup operation of the image pickup element and outputs a low resolution moving image for preview. In step S105, the CPU displays the read moving image by a display unit 131 provided on the back surface of the camera, and the photographer views the preview image and determines a composition at the time of photographing.

In step S106, the CPU recognizes whether a face exists in the moving image for preview. From the moving image for preview, the CPU detects the number of faces, the positions of the faces, and the sizes of the faces, that is, the objects, and records the objects in the built-in memory 144. Since the technique for recognizing the face is disclosed in Japanese Patent Application Laid-Open No. 2004-317699 and is already known, the description will not be given herein.

In step S107, when it is recognized that the face exists in the photographed area, the processing proceeds to step S108 and sets a focus adjustment mode to a face AF mode. In this case, the face AF mode indicates an AF mode where the position of the face of the photographed area and the object distance map generated in step S200 are added and the focus is made.

Meanwhile, in step S107, when it is recognized that the face does not exist in the photographed area, the processing proceeds from step S107 to step S109 and sets the focus adjustment mode to a multi-point AF mode. In this case, the multi-point AF mode indicates a mode where the photographed area is divided into 3×5=15, a main object is analogized based on the focus detection result in each division area calculated from the object distance map and the brightness information of the object, and the corresponding area is in focus.

In step S108 or S109, if the AF mode is determined, the CPU determines whether the photographing preparation switch is turned on, in step S110. When it is determined that the photographing preparation switch is not turned on, the processing proceeds to step S116 and determines whether the main switch is turned off.

In step S111, when the photographing preparation switch is turned on, the processing proceeds to step S200 and executes an object distance map generating subroutine.

In step S111, the CPU determines the focus detection position based on the object distance map calculated in step S200. In this case, in the detection position determining method, the nearest side is set to have the priority and the position of the object positioned at the nearest side among the objects obtained in steps S200 is set as the focus detection position.

In step S112, the CPU calculates the defocus amount at the focus detection position determined in step S111 from the defocus map obtained in step S200 and determines whether the obtained defocus amount is an allowance value or less. When the defocus amount is more than the allowance value, the CPU determines the determination result as out of focus, and drives the focus lens in step S113. Then, the processing returns to step S110 and determines whether the photographing preparation switch is pressed. In step S112, when it is determined that the state becomes an in-focus state, the CPU performs the in-focus display in step S114 and the processing proceeds to step S115.

In step S115, the CPU determines whether the photographing start switch is turned on. When it is determined that the photographing start switch is not turned on, a photographing waiting state is maintained in step S115. In step S115, when the photographing start switch is turned on, the processing proceeds to step S300 and executes the photographing subroutine.

When the photographing subroutine of step S300 ends, the processing proceeds to step S116 and determines whether the main switch is turned off. When it is determined that the main switch is not turned off, the processing returns to step S103. When it is determined that the main switch is turned off, the CPU ends the series of operations.

Figure 15:
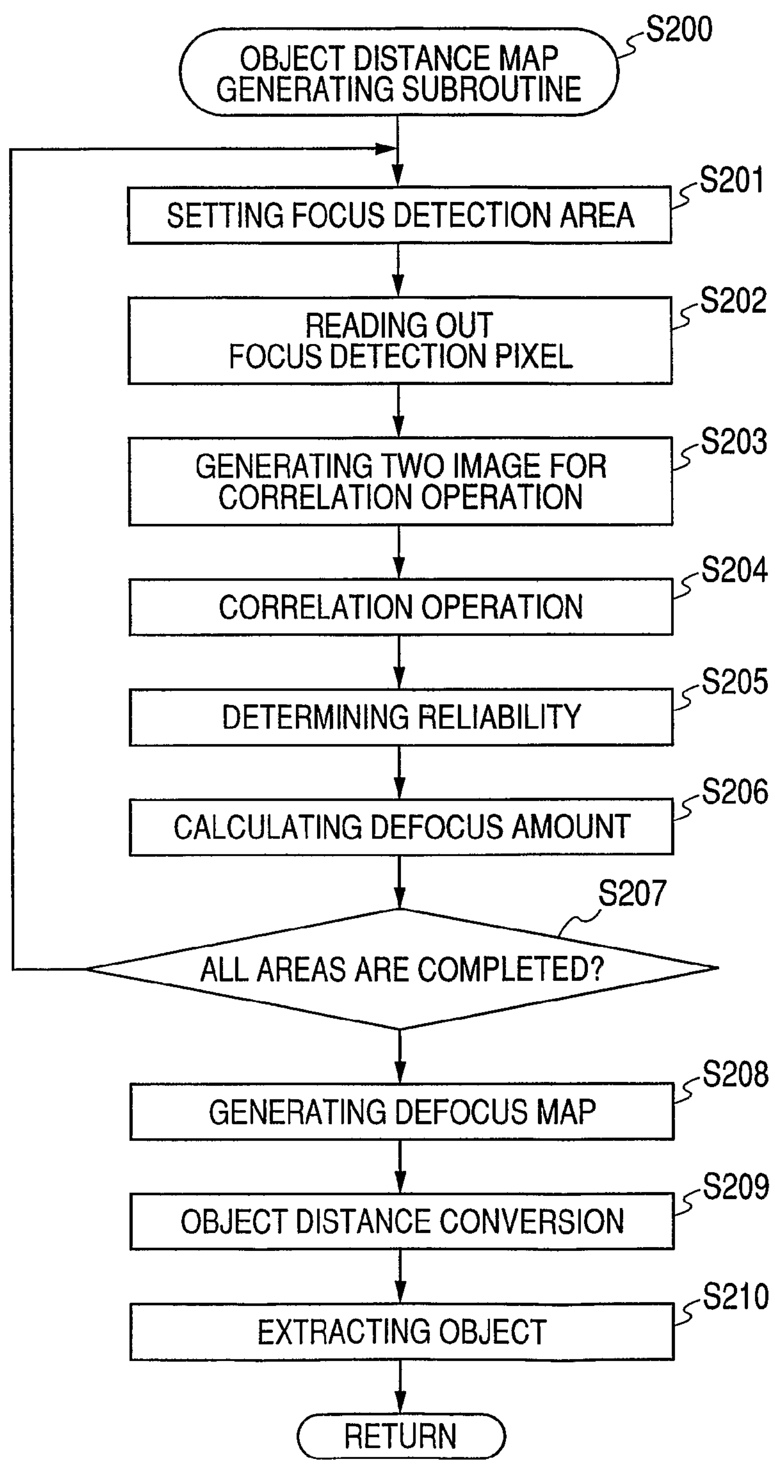
FIG. 15 is a flowchart illustrating an object distance map generating subroutine.

FIG. 15 is a flowchart illustrating an object distance map generating subroutine. A series of operations (function of acquiring distance information) of the object distance map generating subroutine is also executed by the CPU 121.

If the process jumps from step S200 of the main flow to step S200 of the corresponding subroutine, the CPU sets the focus detection area in step S201. The CPU determines the focus detection area from all of the focus detection areas and executes the following processes of step S202. In step S202, the CPU reads the signal of the focus detection pixel of the focus detection area set in step S201. In step S203, the CPU generates two images for a correlation operation. If the signals of the individual focus detection pixels read in step S202 are arranged, the signals become signals of the two images A and B for the correlation operation.

In step S204, the CPU performs the correlation operation based on the obtained image signals and calculates a phase difference of the two images A and B. In step S205, the CPU determines reliability of the correlation operation result. In this case, the reliability unit a matching degree of the images A and B, and when the matching degree of the images A and B is high, the reliability of the focus detection result is generally high. Accordingly, the CPU can determine reliability of a phase difference detection result based on whether the matching degree exceeds a threshold value and can preferentially use information having high reliability, when plural focus detection areas are selected. In step S206, the CPU multiplies the phase difference of the images A and B obtained in step S204 by a conversion coefficient to convert the phase difference into the defocus amount, thereby operating the defocus amount.

In step S207, the CPU determines whether the calculation of the defocus amount is completed with respect to all of the focus detection areas. When it is determined that the calculation is not completed with respect to all of the focus detection areas, the processing returns to step S201, and selects the focus detection area from the remaining focus detection areas and sets the focus detection area. In step S207, when it is determined that the calculation is completed with respect to all of the focus detection areas, the processing proceeds to step S208.

In step S208, the CPU generates the defocus amount map from the defocus amounts in all of the focus detection areas obtained by repeating the processes of steps S201 to S207. In this case, the defocus amount map is distribution data where the position on the photographing screen and the defocus amount are associated with each other.

In step S209, with respect to the defocus map obtained in step S208, in consideration of the lens information obtained from the photographing lens 137 by the lens communication in step S103, the CPU performs a conversion from the defocus amount to the object distance. Thereby, the distribution data where the position on the photographing screen and the object distance are associated with each other can be obtained.

In step S210, the CPU extracts the objects based on the distribution data of the object distance. The CPU joints areas where the object distances are short in a distribution of the obtained object distances and groups the areas and extracts the outline of the object that is included in the photographing screen. Thereby, an object distance map (distance information) where the area of each object and the object distance are associated with each other is obtained.

If the process of step S210 is completed, the CPU ends the object distance map generating subroutine and the processing proceeds to step S111 in the main flow.

Figure 16:
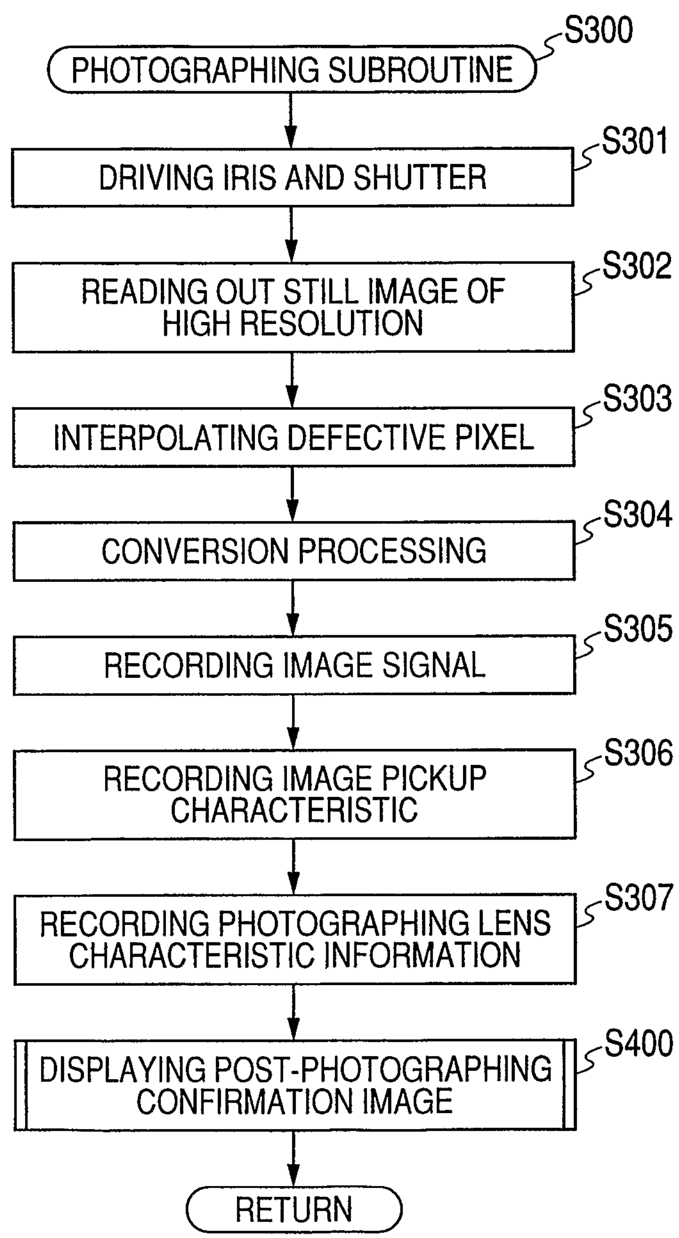
FIG. 16 is a flowchart illustrating a photographing subroutine.

FIG. 16 is a flowchart illustrating a photographing subroutine. A series of operations of the photographing subroutine is executed by the CPU 121 according to the above-described program.

In step S301, the CPU drives the light amount adjustment iris and controls an aperture of a mechanical shutter that defines an exposure time.

In step S302, the CPU reads an image for photographing of a high resolution still image, that is, reads signals of all the pixels.

In step S303, the CPU performs defective pixel interpolation of the read image signals. That is, an output of the focus detection pixel does not have RGB color information for photographing and the focus detection pixel corresponds to the defective pixel in obtaining the image. Therefore, the CPU generates an image signal from the information of the peripheral image pickup pixel by interpolation.

In step S304, the CPU executes image processing, such as gamma correction, color conversion, and edge emphasis of the image. In step S305, the CPU records the photographed image in the flash memory 133. The photographed image that is recorded in step S305 is set to an image where the blur is not corrected. When the recorded image is reproduced and displayed, the blur is corrected and the image is displayed. Thereby, the operation load of the image pickup apparatus is alleviated. The process of step S305 where the photographed image is recorded is executed by the CPU 121.

In step S306, characteristic information of the camera body 138 is recorded in the flash memory 133 and the built-in memory 144 to correspond to the photographed image recorded in step S305. In this case, the characteristic information of the camera body 138 includes optical characteristics, such as light reception sensitivity distribution information of the image pickup pixel and the focus detection pixel of the image pickup element 107, blank strip information of the photographing light flux in the camera body 138, distance information from mounting planes of the camera body 138 and the photographing lens 137 to the image pickup element 107, and manufacture error information. Since the light reception sensitivity distribution information of the image pickup pixel and the focus detection pixel of the image pickup element 107 is determined by the on-chip micro lens ML and the photoelectric conversion unit PD, this information may be recorded.

In step S307, characteristic information of the photographing lens 137 is recorded in the flash memory 133 and the built-in memory 144 to correspond to the photographed image recorded in step S305. In this case, the characteristic information of the photographing lens 137 includes optical characteristics, such as information of the exit pupil EP, frame information, F number information at the time of photographing, aberration information, and manufacture error information.

In the image pickup apparatus according to the present invention, as illustrated in steps S305 to S307, the photographed image where the blur correction is not performed and the photographing lens characteristic information and the image pickup apparatus characteristic information corresponding to the photographed image are recorded in the flash memory 133. Thereby, the blur of the photographed image can be corrected based on the photographing lens characteristic information and the photographing characteristic information, after the photographing. The operation load at the time of recording the photographed image can be alleviated. The recording of the photographed image, the photographing lens characteristic information, and the image pickup apparatus characteristic information that is performed in steps S305 to S307 is performed by the CPU 121.

If the process of step S307 is completed, the processing proceeds to a post-photographing confirmation image display subroutine of step S400.

If the post-photographing confirmation image display subroutine of step S400 ends, the CPU ends the photographing subroutine of step S300 and the processing proceeds to step S116 of the main routine.

Figure 17:
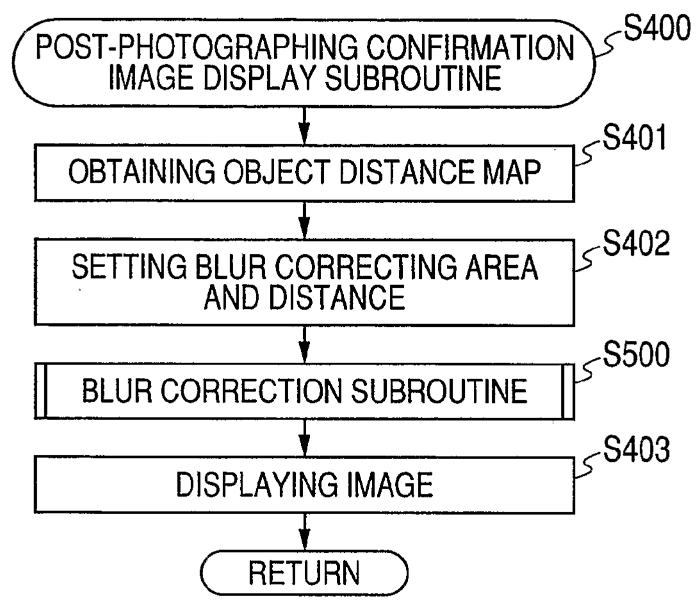
FIG. 17 is a flowchart illustrating a confirmation image display subroutine after photographing.

FIG. 17 is a flowchart illustrating the post-photographing confirmation image display subroutine. A series of operations of the post-photographing confirmation image display subroutine is also executed by the CPU 121. An image display control unit in claims corresponds to the CPU 121.

In step S401, the CPU obtains the object distance map generated in step S200.

In step S402, the CPU sets the object area where the blur is corrected and the object distance. As illustrated in the object distance map generating subroutine of step S200, information where the object area and the object distance are associated with each other is obtained from the object distance map. As described in FIG. 9, a blur correctable distance range is determined by the photographing lens 137 and the first distance Dist11 that is the nearest side distance where the blur can be corrected and the second distance Dist12 that is the most infinite side distance are changed. Accordingly, the object where the object distance exists in a blur correctable distance range (from the first distance Dist11 to the second distance Dist12) determined by the photographing lens 137 is set such that the blur is corrected. Thereby, each object area and the object distance used when the blur of the area thereof is corrected can be set.

The first distance Dist11 and the second distance Dist12 that define the blur correctable distance range are set again such that the shift amount from the image plane position of the photographing lens 137 becomes the predetermined amount or less. Thereby, the blur amount can be maintained at the predetermined amount or less and superior blur correction can be performed.

If the blur correcting area and distance setting of step S402 is completed, the processing proceeds to the blur correction subroutine of step S500.

In step S403, the CPU displays the image where the blur is corrected in step S500 by the display unit 131 for a predetermined time. At this time, as the displayed image, as illustrated in FIG. 13A, only the blur corrected image is displayed or the positions and the number of objects are displayed to be superimposed on the blur corrected image, as illustrated in FIG. 13B. The display is switched according to a setting value that the photographer inputs through the operation switch 132.

If the process of step S403 is completed, the CPU ends the post-photographing confirmation image display subroutine and the processing returns to the photographing subroutine.

Figure 18:
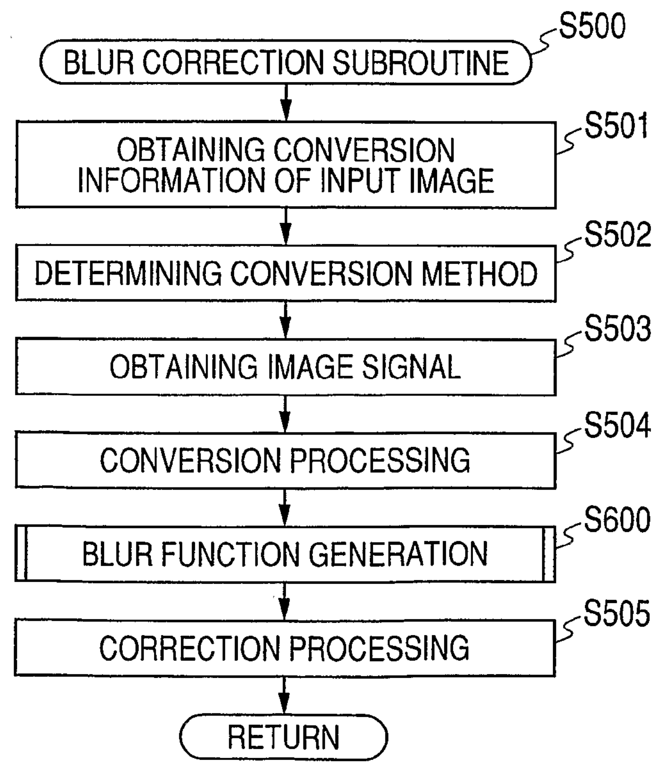
FIG. 18 is a flowchart illustrating a blur correction subroutine.

FIG. 18 is a flowchart illustrating a blur correction subroutine. A series of operations of the blur correction subroutine is also performed by the CPU 121. A blur correcting unit in claims corresponds to the CPU 121.

In step S501, the CPU 121 obtains conversion information that indicates contents of conversion processing in the image processing circuit 125.

In step S502, the CPU 121 determines a conversion method that is used when the image information supplied from the image processing circuit 125 is converted. Specifically, the CPU 121 determines the conversion method based on the conversion information (if necessary, the image pickup apparatus characteristic information or the photographing lens characteristic information obtained in step S306 or step S307, in addition to the conversion information) obtained in step S501. In this case, the determined conversion method is a method that converts image information, such that an exposure value and a pixel value are in a proportional relationship, in order to secure linearity corresponding to a premise condition of an algorithm of the image restoring process disclosed in Patent Document 2.

For example, when the gamma correction is executed by the image processing circuit 125, the CPU executes an inverse conversion of the conversion based on the gamma correction in step S502. Thereby, an image before the conversion can be reproduced and an image having linearity can be obtained. Likewise, when the color correction is executed by the image processing circuit 125, an inverse conversion of the conversion based on the color conversion is executed in step S502. Thereby, an image having the linearity can be obtained. As such, in step S502, a conversion method that corresponds to the inverse conversion of the conversion processing by the image processing circuit 125 is determined.

In step S503, the photographed image is obtained by the image processing circuit 125. In step S504, the obtained photographed image is converted according to the conversion method determined in step S502. If the conversion processing is completed in step S504, the processing proceeds to step S600 and generates a blur function.

In step S505, the CPU performs an inverse conversion of the blur function generated in step S600 and executes a blur correction processing on the photographed image converted in step S504. In this case, the blur correction processing is executed by an image restoration algorithm called deconvolution processing. Thereby, a blur corrected image where the blur of a predetermined object is corrected can be obtained. Since the method that corrects the blur by executing the inverse conversion processing of the blur function is disclosed in Patent Document 2, the description thereof will not be given herein.

If the process of step S505 is completed, the CPU ends the blur correction subroutine and the processing proceeds to step S403 in the post-photographing confirmation image display subroutine.

Figure 19:
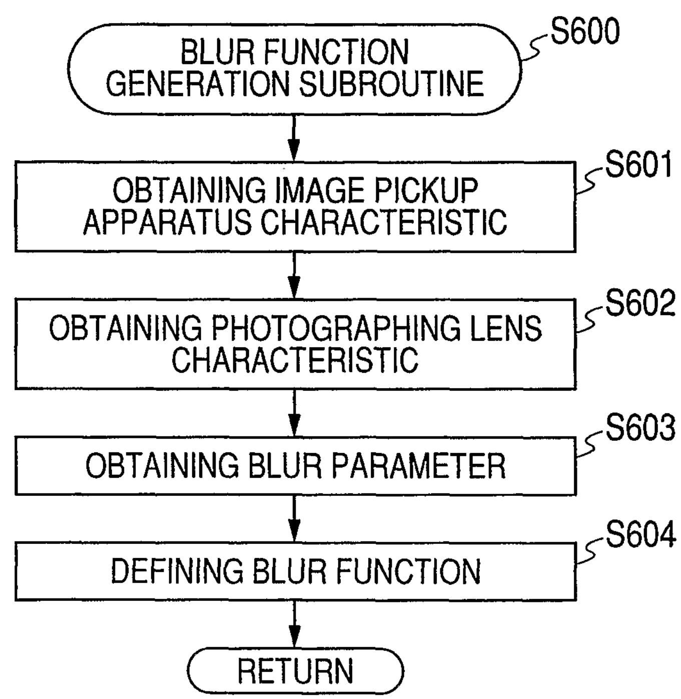
FIG. 19 is a flowchart illustrating a blur function generating routine.

FIG. 19 is a flowchart illustrating the blur function generation subroutine. A series of operations of the blur function generation subroutine is also performed by the CPU 121.

In step S601, the CPU obtains the characteristic information of the camera body 138 that is recorded in the built-in memory 144 in step S305 at the time of photographing.

In step S602, the CPU obtains the characteristic information of the photographing lens 137 that is recorded in the built-in memory 144 in step S306 at the time of photographing.

In step S603, the CPU obtains parameters that are used when the blur function is defined. The blur function is determined by an optical transmission characteristic between the photographing lens 137 and the image pickup element 107. An optical transmission unit is changed according to factors, such as the characteristic information of the camera body 138, the characteristic information of the photographing lens 137, the position of the object area in the photographed image, and the object distance. Accordingly, the CPU stores table data where the factors and the parameters used when the blur function is defined are associated with each other in the built-in memory 144. If the process of step S603 is executed, the CPU 121 obtains the parameters, which are used when the blur function is defined, from the built-in memory 144, based on the factors.

In step S604, the CPU defines the blur function based on the blur parameters obtained in step S603. As an example of the blur function includes a Gaussian distribution where a blur phenomenon is considered as following a normal distribution method. If the distance from the central pixel is defined as r and an arbitrary parameter of the normal distribution method is defined as σ2, a blur function h(r) is given as follows:

$$h(r) = \frac{1}{\sigma\sqrt{2\pi}}\exp\left(-\frac{r^2}{\sigma^2}\right) \tag{1}$$

If the process of step S604 is completed, the CPU ends the blur function generation subroutine and the processing proceeds to step S505 in the blur correction subroutine.

In the image pickup apparatus according to the present invention, the camera where the photographing lens can be exchanged is exemplified, but the present invention may be applied to a camera of a so-called lens attached type where the photographing lens is included in the camera. Even in the camera of the lens attached type, the conventional problem exists. As described in the present invention, the same effect can be obtained by displaying the blur corrected photographed image.

As described above, according to the image pickup apparatus of the present invention, an image pickup apparatus with a blur correcting unit which causes the photographer to easily confirm the photographed image can be realized.

Second Embodiment

Figure 20:
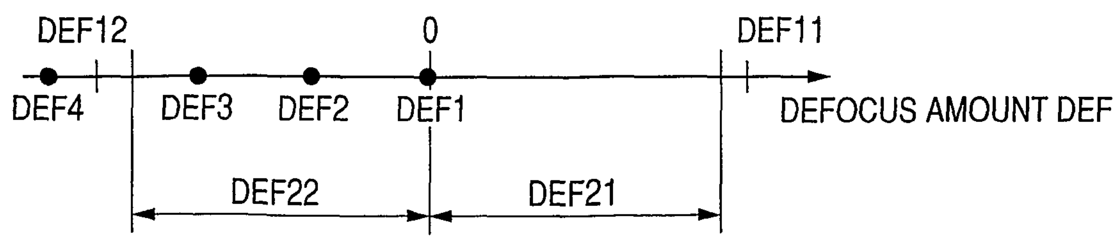
FIG. 20 is a diagram illustrating a relationship between an object distance image plane position and an image plane position of a photographing lens 137 in a second embodiment of the present invention.

FIG. 20 illustrates a second embodiment of the present invention. Hereinafter, a processing operation in the second embodiment of the present invention will be described using the drawings.

In the first embodiment, the defocus amounts Def21 and Def22 that correspond to the blur amount where the blur can be corrected exist to be closer to the outside than the defocus amounts Def11 and Def12 at the image plane positions of the first distance Dist11 of the nearest side and the second distance Dist12 of the infinite side. For this reason, the first distance Dist11 of the nearest side and the second distance Dist12 of the infinite side are not updated.

Meanwhile, in the second embodiment, the defocus amounts Def21 and Def22 that correspond to the blur amount where the blur can be corrected exist to be closer to the inside than the defocus amounts Def11 and Def12 at the image plane positions of the first distance Dist11 of the nearest side and the second distance Dist12 of the infinite side. For this reason, the places where the first distance Dist11 of the nearest side and the second distance Dist12 of the infinite side are updated according to the defocus amounts Def12 and Def22 are different from those of the first embodiment.

FIG. 20 illustrates a relationship between the image plane positions corresponding to the object distances Dist1, Dist2, Dist3, and Dist4 and the image plane position of the photographing lens 137. An axis indicates the defocus amount Def from the image plane position of the photographing lens 137. In this case, a plus direction of the defocus amount Def corresponds to a post in-focus direction.

"0" indicates the image plane position of the photographing lens 137 and the shift amount is expressed as "0". Def1, Def2, Def3, and Def4 indicate the defocus amounts at the image plane positions of the object distances Dist1, Dist2, Dist3, and Dist4, respectively. Def11 and Def12 indicate the defocus amounts at the image plane positions of the first distance Dist11 of the nearest side and the second distance Dist12 of the infinite side, respectively.

Meanwhile, Def21 and Def22 indicate the defocus amounts that correspond to the blur amount where the blur can be corrected, respectively. When the blur amount is excessively large, extreme conversion processing is executed at the time of restoring a blurred image, and a noise is likely to be generated. For this reason, when the blur is corrected, the blur amount is preferably included in a range of Def21 and Def22. Since Def11 and Def12 exist at the outside of Dif21 and Def22, the blur may not be corrected well.

Accordingly, the first distance Dist11 of the nearest side is corrected such that the defocus amount Def11 at the first distance Dist11 of the nearest side becomes the defocus amount corresponding to the defocus amount Def21. Likewise, the second distance Dist12 of the infinite side is corrected such that the defocus amount Def12 at the second distance Dist12 of the infinite side becomes the defocus amount corresponding to the defocus amount Def22. Thereby, the problem that is generated when the blur amount is excessively large, the extreme conversion processing is executed at the time of restoring the blurred image, and the noise is generated can be alleviated. That is, superior blur correction is enabled.

The operation for updating the first distance Dist11 of the nearest side and the second distance Dist12 of the infinite side according to the defocus amounts Def21 and Def22 is performed in step S402 of the post-photographing confirmation image display subroutine (refer to FIG. 17).

In step S402 of FIG. 17, the object area where the blur is corrected and the object distance are set. As described in the object distance map generating subroutine of step S200, the information where the object area and the object distance are associated with each other is obtained from the object distance map. The object where the object distance exists in the blur correctable distance range (from the first distance Dist11 to the second distance Dist12) determined by the photographing lens 137 is set such that the blur correction is performed. The distances are set again such that, in the first distance Dist11 and the second distance Dist12 existing in the blur correctable distance range, the shift amounts from the image plane position of the photographing lens 137 become the predetermined amount or less. Thereby, the blur amount can be maintained at the predetermined amount or less and the superior blur correction can be performed.

Since the configuration of the image pickup apparatus and the image pickup element and the structure of the pixels in the second embodiment are the same as those of the first embodiment, the description thereof will not be repeated. Also, since the relationship between the object distance, the blur correctable distance, and the distance information obtained by the distance information acquiring unit is the same as that of the first embodiment, the description thereof will not be repeated. Also, since the operation flow of the image pickup apparatus according to the second embodiment is the same as that of the first embodiment, the description thereof will not be repeated.

As described above, even in the second embodiment of the present invention, an image pickup apparatus with a blur correcting unit which causes the photographer to easily confirm the photographed image can be realized.

The preferred embodiments of the present invention have been described. However, the present invention is not limited to the embodiments, and various modifications and changes can be made without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

This application claims the benefit of Japanese Patent Application No. 2009-115592, filed on May 12, 2009, which is hereby incorporated by reference herein in its entirety.

The invention claimed is:

1. An image processing apparatus, comprising:

a display unit which displays a photographed image obtained by a photoelectric conversion unit;

an image display control unit which displays the photographed image by the display unit after the photographed image is obtained by the photoelectric conversion unit;

a distance information acquiring unit which obtains object distance information in the photographed image;

a blur change unit which changes a blur state of an object image in the photographed image by performing image processing on the photographed image based on the object distance information obtained by the distance information acquiring unit; and a recording unit which records the photographed image where the blur state is not changed, photographing lens characteristic information and photoelectric conversion unit characteristic information with being related to each other, wherein the image display control unit displays the photographed image where plural object distances in the photographed image are focused by the blur change unit.

2. The image processing apparatus according to claim 1, wherein the photographing lens characteristic information includes optical characteristics of a photographing lens which forms an object image, and the photoelectric conversion unit characteristic information includes an optical characteristic of the photoelectric conversion unit.

3. The image processing apparatus according to claim 1, further comprising:

an object detecting unit which detects an object in the photographed image; and an object position display unit which displays the position of the object detected by the object detecting unit by the display unit so as to be superimposed on the photographed image.

4. The image processing apparatus according to claim 1, further comprising:

an object detecting unit which detects an object in the photographed image; and a number-of-object display unit which displays the number of objects detected by the object detecting unit on the display unit.

5. The image processing apparatus of claim 1, wherein the image processing is deconvolution processing based on an optical transmission characteristic between the photographing lens and the photoelectric conversion unit.

6. An image processing apparatus, comprising:

a display unit which displays a photographed image obtained by a photoelectric conversion unit;

an image display control unit which displays the photographed image by the display unit after the photographed image is obtained by the photoelectric conversion unit;

a distance information acquiring unit which obtains object distance information in the photographed image; and a blur change unit which changes a blur state of an object image in the photographed image to a focused state by performing image processing on the photographed image based on the object distance information obtained by the distance information acquiring unit, wherein the image display control unit displays the photographed image where blur state is changed by the blur change unit in a range from a first object distance to a second object distance according to the object distance information in the photographed image, and wherein the first object distance is determined based on an end of nearest side distance of a photographing lens and the second object distance is determined based on an end of infinite side distance of the photographing lens.

7. The image processing apparatus according to claim 6, wherein the range of the first object distance and the second object distance is set such that the difference amount of an image plane position of each of the first object distance and the second object distance and image plane position of the photographing lens is the predetermined amount or less.

8. The image processing apparatus according to claim 6, further comprising:

an object detecting unit which detects an object in the photographed image; and an object position display unit which displays the position of the object detected by the object detecting unit on the display unit so as to be superimposed on the photographed image.

9. The image processing apparatus according to claim 6, further comprising:

an object detecting unit which detects an object in the photographed image; and a number-of-object display unit which displays the number of objects detected by the object detecting unit on the display unit.

10. The image processing apparatus of claim 6, wherein the image processing unit is deconvolution processing based on an optical transmission characteristic between a photographing lens and the photoelectric conversion unit.

11. An image processing apparatus, comprising:

a display unit which displays a photographed image obtained by a photoelectric conversion unit;

an image display control unit which displays the photographed image on the display unit after the photographed image is obtained by the photoelectric conversion unit;

a distance information acquiring unit which obtains object distance information in the photographed image; and a blur change unit which changes a blur state of an object image in the photographed image to a focused state by performing image processing on the photographed image based on the object distance information obtained by the distance information acquiring unit, wherein the image display control unit displays a range where blur state is changeable.

12. The image processing apparatus of claim 11, wherein the image processing is deconvolution processing based on an optical transmission characteristic between a photographing lens which forms an object image and the photoelectric conversion unit.

13. The image processing apparatus according to claim 11, further comprising an object detecting unit which detects an object in the photographed image, wherein the image display control unit displays the position of the object detected by the object detecting unit so as to be superimposed on the photographed image.

14. The image processing apparatus according to claim 11, further comprising an object detecting unit which detects an object in the photographed image, wherein the image display control unit displays the number of objects detected by the object detecting unit.

15. An image processing apparatus, comprising:

a display unit which displays a photographed image obtained by a photoelectric conversion unit;

an image display control unit which displays the photographed image by the display unit after the photographed image is obtained by the photoelectric conversion unit;

an information acquiring unit which obtains defocus information in the photographed image;

a blur change unit which changes a blur state of an object image in the photographed image by performing image processing on the photographed image based on the defocus information obtained by the information acquiring unit; and a recording unit which records the photographed image where the blur state is not changed, photographing lens characteristic information and image pickup apparatus characteristic information with being related to each other, wherein the image display control unit displays the photographed image where plural object distances in the photographed image are focused by the blur change unit.

16. An image processing apparatus, comprising:

a display unit which displays a photographed image obtained by a photoelectric conversion unit;

an image display control unit which displays the photographed image on the display unit after the photographed image is obtained by the photoelectric conversion unit;

an information acquiring unit which obtains defocus information in the photographed image; and a blur change unit which changes a blur state of an object image in the photographed image to a focused state by performing image processing on the photographed image based on the defocus information obtained by the information acquiring unit, wherein the image display control unit displays a range information where blur is changeable.

17. A control method of an image processing apparatus including a display unit which displays a photographed image obtained by a photoelectric conversion unit, comprising:

an image display control step of displaying the photographed image by the display unit after the photographed image is obtained by the photoelectric conversion unit;

a distance information acquiring step of obtaining object distance information in the photographed image;

a blur change step of changing a blur state of an object image in the photographed image by performing image processing on the photographed image based on the distance information obtained in the distance information acquiring step; and a recording unit step of recording the photographed image where the blur state is not changed, photographing lens characteristic information and photoelectric conversion unit characteristic information with being related to each other, wherein the image display control step includes displaying the photographed image where plural object distances in the photographed image are focused by the blur change step.

18. A control method of an image processing apparatus including a display unit which displays a photographed image obtained by a photoelectric conversion unit, comprising:

an image display control step of displaying the photographed image by the display unit after the photographed image is obtained by the photoelectric conversion unit;

a distance information acquiring step of obtaining object distance information in the photographed image; and a blur change step of changing a blur state of an object image in the photographed image to a focused state by performing image processing on the photographed image based on the object distance information obtained in the distance information acquiring step, wherein the image display control step includes displaying the photographed image where blur is changed in the blur change step in a range from a first object distance to a second object distance according to the object distance information in the photographed image, and wherein the first object distance is determined based on an end of nearest side distance of a photographing lens and the second object distance is determined based on an end of infinite side distance of the photographing lens.

19. A control method of an image processing apparatus including a display unit which displays a photographed image obtained by a photoelectric conversion unit, comprising:

an image display control step of displaying the photographed image on the display unit after the photographed image is obtained by the photoelectric conversion unit;

a distance information acquiring step of obtaining object distance information in the photographed image; and a blur change step of changing a blur state of an object image in the photographed image to a focused state by performing image processing on the photographed image based on the object distance information obtained in the distance information acquiring step, wherein the image display control step includes displaying the object distance range information where blur is changeable.

20. A control method of an image processing apparatus including a display unit which displays a photographed image obtained by a photoelectric conversion unit, comprising:

an image display control step of displaying the photographed image by the display unit after the photographed image is obtained by the photoelectric conversion unit;

an information acquiring step of obtaining defocus information in the photographed image;

a blur change step of changing a blur state of an object image in the photographed image by performing image processing on the photographed image based on the defocus information obtained in the information acquiring step; and a recording step of recording the photographed image where the blur state is not changed, photographing lens characteristic information and photoelectric conversion unit characteristic information with being related to each other, wherein the image display control step includes displaying the photographed image where plural object distances in the photographed image are focused by the blur change step.

21. A control method of an image processing apparatus including a display unit which displays a photographed image obtained by a photoelectric conversion unit, comprising:

an image display control step of displaying the photographed image on the display unit after the photographed image is obtained by the photoelectric conversion unit;

an information acquiring step of obtaining defocus information in the photographed image; and a blur change step of changing a blur state of an object image in the photographed image to a focused state by performing image processing on the photographed image based on the defocus information obtained in the information acquiring step, wherein the image display control step includes displaying a range information where blur state is changeable.

22. A control method of an image processing apparatus including a display unit which displays a photographed image obtained by a photoelectric conversion unit, comprising:

an image display control step of displaying the photographed image by the display unit after the photographed image is obtained by the photoelectric conversion unit;

an information acquiring step of obtaining defocus information in the photographed image;

a blur change step of changing a blur state of an object image in the photographed image by performing image processing on the photographed image based on the defocus information obtained in the information acquiring step; and a recording step of recording the photographed image where the blur is not changed, photographing lens characteristic information and image pickup apparatus characteristic information with being related to each other, wherein the image display control step includes displaying the object distance range information where blur is changeable.

23. A control method of an image processing apparatus including a display unit which displays a photographed image obtained by a photoelectric conversion unit, comprising:

an image display control step of displaying the photographed image on the display unit after the photographed image is obtained by the photoelectric conversion unit;

an information acquiring step of obtaining defocus information in the photographed image; and a blur change step of changing a blur state of an object image in the photographed image by performing image processing on the photographed image based on the defocus information obtained in the information acquiring step, wherein the image display control step includes displaying the photographed image where plural object distances in the photographed image are focused by the blur change step.

* * * * *